United States Patent
Kundu

(10) Patent No.: US 11,295,374 B2
(45) Date of Patent: *Apr. 5, 2022

(54) MULTILEVEL SILHOUETTES IN AN ONLINE SHOPPING ENVIRONMENT

(71) Applicant: eBay Inc., San Jose, CA (US)

(72) Inventor: Rini Kundu, San Jose, CA (US)

(73) Assignee: eBay Inc., San Jose, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/841,805

(22) Filed: Dec. 14, 2017

(65) Prior Publication Data

US 2018/0130121 A1    May 10, 2018

Related U.S. Application Data

(63) Continuation of application No. 13/852,879, filed on Mar. 28, 2013, now Pat. No. 9,846,903, which is a continuation of application No. 13/011,510, filed on Jan. 21, 2011, now Pat. No. 8,412,594.

(60) Provisional application No. 61/377,914, filed on Aug. 28, 2010.

(51) Int. Cl.
  *G06Q 30/06* (2012.01)
  *G06F 16/54* (2019.01)
  *G06F 16/532* (2019.01)
  *G06F 16/58* (2019.01)

(52) U.S. Cl.
  CPC ....... *G06Q 30/0643* (2013.01); *G06F 16/532* (2019.01); *G06F 16/54* (2019.01); *G06F 16/5866* (2019.01); *G06Q 30/0603* (2013.01); *G06Q 30/0621* (2013.01)

(58) Field of Classification Search
  CPC ................................. G06Q 30/06–08
  USPC ................................. 705/26.1–27.2
  See application file for complete search history.

(56) References Cited

U.S. PATENT DOCUMENTS

| | | |
|---|---|---|
| 5,852,823 A | 12/1998 | De Bonet |
| 6,393,427 B1 | 5/2002 | Vu et al. |
| 6,446,061 B1 | 9/2002 | Doerre et al. |
| 6,546,309 B1 | 4/2003 | Gazzuolo |
| 6,704,725 B1 | 3/2004 | Lee |
| 6,751,343 B1 | 6/2004 | Ferrell et al. |

(Continued)

FOREIGN PATENT DOCUMENTS

| | | | |
|---|---|---|---|
| AU | 2011299401 B2 | 5/2014 | |
| AU | 2012318961 B2 | 3/2016 | |

(Continued)

OTHER PUBLICATIONS

Definition of silhouette https://www.dictionary.com/browse/silhouette.*

(Continued)

*Primary Examiner* — Ming Shui
(74) *Attorney, Agent, or Firm* — FIG. 1 Patents

(57) ABSTRACT

Selecting a first silhouette image of an item at a client machine displays a plurality of silhouette images representing aspects of the item such as style, length type and sleeve type. Selecting any of those aspects allows a server to search a database for listings of similar items that have those aspects. Concurrently selecting one or more of the images representing those aspects and one or more sizes, allows a server to search a database for listings of similar items that have those aspects and those sizes.

20 Claims, 13 Drawing Sheets

(56) References Cited

U.S. PATENT DOCUMENTS

| | | | |
|---|---|---|---|
| 6,751,600 B1 | 6/2004 | Wolin | |
| 6,763,148 B1 | 7/2004 | Sternberg et al. | |
| 6,804,683 B1 | 10/2004 | Matsuzaki et al. | |
| 6,865,302 B2 | 3/2005 | Chang | |
| 6,925,196 B2 | 8/2005 | Kass et al. | |
| 6,941,321 B2 | 9/2005 | Schuetze et al. | |
| 7,035,440 B2 | 4/2006 | Kaku | |
| 7,035,467 B2 | 4/2006 | Nicponski | |
| 7,260,568 B2 | 8/2007 | Zhang et al. | |
| 7,277,572 B2 | 10/2007 | MacInnes et al. | |
| 7,315,833 B2 | 1/2008 | Schrenk | |
| 7,437,321 B2 | 10/2008 | Hanechak | |
| 7,617,016 B2 | 11/2009 | Wannier et al. | |
| 7,620,539 B2 | 11/2009 | Gaussier et al. | |
| 7,657,126 B2 | 2/2010 | Gokturk et al. | |
| 7,783,622 B1 | 8/2010 | Vandermolen et al. | |
| 7,930,546 B2 | 4/2011 | Rhoads et al. | |
| 7,996,282 B1 | 8/2011 | Scott et al. | |
| 8,073,818 B2 | 12/2011 | Duan et al. | |
| 8,081,158 B2 | 12/2011 | Harris | |
| 8,121,902 B1 | 2/2012 | Desjardins et al. | |
| 8,180,690 B2 | 5/2012 | Mayle et al. | |
| 8,295,854 B2 | 10/2012 | Osann, Jr. | |
| 8,306,872 B2 | 11/2012 | Inoue et al. | |
| 8,412,594 B2 | 4/2013 | Kundu | |
| 8,429,173 B1 | 4/2013 | Rosenberg et al. | |
| 8,467,613 B2 | 6/2013 | Baker et al. | |
| 8,520,979 B2 | 8/2013 | Conwell | |
| 8,543,580 B2 | 9/2013 | Chen et al. | |
| 8,595,651 B2 | 11/2013 | Kenemer et al. | |
| 8,719,075 B2 | 5/2014 | MacDonald Korth et al. | |
| 8,732,151 B2 | 5/2014 | Ali et al. | |
| 8,738,630 B2 | 5/2014 | Lin | |
| 8,781,231 B1 | 7/2014 | Kumar et al. | |
| 8,861,844 B2 | 10/2014 | Chittar et al. | |
| 8,903,816 B2 | 12/2014 | Dumon et al. | |
| 8,949,252 B2 | 2/2015 | Chittar et al. | |
| 9,043,828 B1 | 5/2015 | Jing et al. | |
| 9,092,458 B1 | 7/2015 | Perona et al. | |
| 9,280,563 B2 | 3/2016 | Chittar et al. | |
| 9,405,773 B2 | 8/2016 | Chittar et al. | |
| 9,471,604 B2 | 10/2016 | Chittar et al. | |
| 9,715,510 B2 | 7/2017 | Chittar et al. | |
| 9,792,638 B2 | 10/2017 | Liu et al. | |
| 9,846,903 B2 | 12/2017 | Kundu | |
| 10,528,615 B2 | 1/2020 | Chittar et al. | |
| 2001/0016077 A1 | 8/2001 | Oki | |
| 2002/0035518 A1 | 3/2002 | Kano | |
| 2002/0106111 A1 | 8/2002 | Kass et al. | |
| 2002/0143636 A1 | 10/2002 | Carignani | |
| 2002/0156694 A1 | 10/2002 | Christensen et al. | |
| 2003/0083850 A1 | 5/2003 | Schmidt et al. | |
| 2003/0130910 A1* | 7/2003 | Pickover | G06Q 30/06 |
| | | | 705/26.8 |
| 2003/0187844 A1 | 10/2003 | Li et al. | |
| 2004/0030578 A1 | 2/2004 | Cross et al. | |
| 2004/0083203 A1 | 4/2004 | Kemp | |
| 2004/0182413 A1 | 9/2004 | de Laforcade | |
| 2004/0228526 A9 | 11/2004 | Lin et al. | |
| 2005/0022106 A1 | 1/2005 | Kawai et al. | |
| 2005/0022708 A1 | 2/2005 | Lee | |
| 2005/0071256 A1 | 3/2005 | Singhal | |
| 2005/0164273 A1 | 7/2005 | Stoughton et al. | |
| 2005/0196016 A1 | 9/2005 | Sato et al. | |
| 2006/0080182 A1 | 4/2006 | Thompson et al. | |
| 2006/0212362 A1 | 9/2006 | Donsbach et al. | |
| 2007/0005571 A1 | 1/2007 | Brewer et al. | |
| 2007/0074110 A1 | 3/2007 | Miksovsky et al. | |
| 2007/0112640 A1 | 5/2007 | Grove et al. | |
| 2007/0162328 A1 | 7/2007 | Reich | |
| 2007/0168357 A1 | 7/2007 | Mo | |
| 2007/0172155 A1 | 7/2007 | Guckenberger | |
| 2007/0185865 A1 | 8/2007 | Budzik et al. | |
| 2007/0257792 A1 | 11/2007 | Gold | |
| 2007/0260597 A1 | 11/2007 | Cramer | |
| 2008/0040219 A1 | 2/2008 | Kim et al. | |
| 2008/0040671 A1 | 2/2008 | Reed | |
| 2008/0071553 A1 | 3/2008 | Hamadi et al. | |
| 2008/0109327 A1 | 5/2008 | Mayle et al. | |
| 2008/0154488 A1 | 6/2008 | Silva et al. | |
| 2008/0160956 A1 | 7/2008 | Jackson et al. | |
| 2008/0162032 A1 | 7/2008 | Wuersch et al. | |
| 2008/0168401 A1 | 7/2008 | Boule et al. | |
| 2008/0226119 A1 | 9/2008 | Candelore et al. | |
| 2008/0243837 A1 | 10/2008 | Davis et al. | |
| 2008/0281814 A1 | 11/2008 | Calistri-Yeh et al. | |
| 2008/0301128 A1 | 12/2008 | Gandert et al. | |
| 2009/0018932 A1 | 1/2009 | Evans et al. | |
| 2009/0061884 A1 | 3/2009 | Rajan et al. | |
| 2009/0094138 A1 | 4/2009 | Sweitzer et al. | |
| 2009/0094260 A1 | 4/2009 | Cheng et al. | |
| 2009/0112830 A1 | 4/2009 | Denoue et al. | |
| 2009/0138376 A1 | 5/2009 | Smyers et al. | |
| 2009/0150791 A1* | 6/2009 | Garcia | G06Q 30/08 |
| | | | 715/738 |
| 2009/0172730 A1 | 7/2009 | Schiff et al. | |
| 2009/0182612 A1 | 7/2009 | Challener et al. | |
| 2009/0193675 A1 | 8/2009 | Sieber | |
| 2009/0271293 A1 | 10/2009 | Parkhurst et al. | |
| 2009/0276453 A1 | 11/2009 | Trout et al. | |
| 2009/0287655 A1 | 11/2009 | Bennett | |
| 2009/0313239 A1 | 12/2009 | Wen et al. | |
| 2010/0023407 A1 | 1/2010 | Grady et al. | |
| 2010/0030578 A1 | 2/2010 | Siddique et al. | |
| 2010/0036711 A1 | 2/2010 | Shenfield et al. | |
| 2010/0036883 A1 | 2/2010 | Valencia-Campo et al. | |
| 2010/0094935 A1 | 4/2010 | Svendsen et al. | |
| 2010/0105370 A1 | 4/2010 | Kruzeniski et al. | |
| 2010/0135597 A1* | 6/2010 | Gokturk | G06K 9/46 |
| | | | 382/305 |
| 2010/0138295 A1 | 6/2010 | Caron et al. | |
| 2010/0159904 A1 | 6/2010 | Colligan et al. | |
| 2010/0203901 A1 | 8/2010 | Dinoff et al. | |
| 2010/0241512 A1 | 9/2010 | Tirpak et al. | |
| 2010/0299132 A1 | 11/2010 | Dolan et al. | |
| 2010/0332283 A1 | 12/2010 | Ng et al. | |
| 2010/0332324 A1 | 12/2010 | Khosravy et al. | |
| 2011/0004522 A1 | 1/2011 | Lee | |
| 2011/0040602 A1 | 2/2011 | Kurani | |
| 2011/0055238 A1 | 3/2011 | Slaney et al. | |
| 2011/0085697 A1 | 4/2011 | Clippard et al. | |
| 2011/0093361 A1 | 4/2011 | Morales | |
| 2011/0106594 A1 | 5/2011 | Shirey | |
| 2011/0106805 A1 | 5/2011 | Bao et al. | |
| 2011/0161182 A1 | 6/2011 | Racco | |
| 2011/0184831 A1 | 7/2011 | Dalgleish | |
| 2011/0191374 A1 | 8/2011 | Bengio et al. | |
| 2011/0196724 A1 | 8/2011 | Fenton et al. | |
| 2011/0231278 A1 | 9/2011 | Fries | |
| 2011/0235902 A1 | 9/2011 | Chittar et al. | |
| 2011/0238534 A1 | 9/2011 | Yakkala | |
| 2011/0238536 A1 | 9/2011 | Liu et al. | |
| 2011/0238659 A1 | 9/2011 | Chittar et al. | |
| 2011/0295711 A1 | 12/2011 | Mazmanyan | |
| 2011/0314031 A1 | 12/2011 | Chittar et al. | |
| 2012/0054041 A1 | 3/2012 | Williams | |
| 2012/0054059 A1 | 3/2012 | Rele | |
| 2012/0054060 A1 | 3/2012 | Kundu | |
| 2012/0126998 A1 | 5/2012 | Morgan et al. | |
| 2012/0159294 A1 | 6/2012 | Gonsalves et al. | |
| 2012/0265635 A1 | 10/2012 | Forsblom | |
| 2012/0276928 A1 | 11/2012 | Shutter | |
| 2012/0302258 A1 | 11/2012 | Pai et al. | |
| 2013/0085860 A1 | 4/2013 | Summers et al. | |
| 2013/0085900 A1 | 4/2013 | Williams | |
| 2013/0226743 A1 | 8/2013 | Kundu | |
| 2013/0262455 A1 | 10/2013 | Cramer et al. | |
| 2014/0105489 A1 | 4/2014 | Chittar et al. | |
| 2014/0156410 A1 | 6/2014 | Wuersch et al. | |
| 2014/0324836 A1 | 10/2014 | Chittar et al. | |
| 2015/0039393 A1 | 2/2015 | Jain | |
| 2016/0012124 A1 | 1/2016 | Ruvini et al. | |
| 2017/0004632 A1 | 1/2017 | Chittar et al. | |

(56) References Cited

U.S. PATENT DOCUMENTS

| | | | |
|---|---|---|---|
| 2017/0322951 | A1 | 11/2017 | Chittar et al. |
| 2018/0012277 | A1 | 1/2018 | Liu et al. |
| 2020/0117685 | A1 | 4/2020 | Chittar et al. |

FOREIGN PATENT DOCUMENTS

| | | | |
|---|---|---|---|
| AU | 2014206199 B2 | 8/2016 | |
| CN | 1361494 A | 7/2002 | |
| CN | 101206749 A | 6/2008 | |
| CN | 101441651 A | 5/2009 | |
| CN | 101556584 A | 10/2009 | |
| CN | 103430202 A | 12/2013 | |
| CN | 104040577 A | 9/2014 | |
| CN | 103430202 B | 2/2017 | |
| CN | 106651521 A | 5/2017 | |
| CN | 101546406 A | 9/2019 | |
| EP | 1220129 A2 | 7/2002 | |
| KR | 10-2002-0069767 A | 9/2009 | |
| KR | 10-2010-0020041 A | 2/2010 | |
| RU | 2586028 C2 | 6/2016 | |
| WO | 2001/011491 A1 | 2/2001 | |
| WO | 2009/094724 A1 | 6/2009 | |
| WO | 2012/030672 A1 | 3/2012 | |
| WO | 2012/030674 A2 | 3/2012 | |
| WO | 2012/033654 A2 | 3/2012 | |
| WO | 2013/052316 A1 | 4/2013 | |
| WO | 2014/085657 A1 | 6/2014 | |
| WO | 2012/033654 A3 | 1/2015 | |
| WO | 2012/030674 A3 | 2/2015 | |
| WO | 2016/007382 A1 | 1/2016 | |

OTHER PUBLICATIONS

Corrected Notice of Allowance received for U.S. Appl. No. 15/266,093, dated May 5, 2017, 11 pages.
Notice of Allowance received for U.S. Appl. No. 15/266,093, dated Mar. 10, 2017, 9 pages.
Preliminary Amendment filed for U.S. Appl. No. 15/266,093, dated Sep. 30, 2016, 7 pages.
First Action Interview—Pre-Interview Communication received for U.S. Appl. No. 15/656,410, dated Feb. 26, 2019 4 pages.
Preliminary Amendment for U.S. Appl. No. 15/656,410, filed Feb. 22, 2019, 7 pages.
Response to First Action Interview—Pre-Interview Communication filed on Mar. 26, 2019 for U.S. Appl. No. 15/656,410, dated Feb. 26, 2019, 1 page.
Preliminary Amendment for U.S. Appl. No. 15/656,410, filed Aug. 28, 2017, 8 pages.
Advisory Action received for U.S. Appl. No. 12/749,458, dated May 10, 2013, 3 pages.
Non-Final Office Action received for U.S. Appl. No. 12/749,458, dated Sep. 30, 2014, 40 pages.
Non-Final Office Action received for U.S. Appl. No. 12/749,458, dated Jul. 20, 2012, 24 pages.
Non-Final Office Action received for U.S. Appl. No. 12/749,458, dated Feb. 3, 2012, 26 pages.
Advisory Action received for U.S. Appl. No. 12/749,458, dated Jul. 14, 2015, 3 pages.
Examiner Interview Summary received for U.S. Appl. No. 12/749,458, dated Jun. 20, 2013, 3 pages.
Final Office Action received for U.S. Appl. No. 12/749,458, dated Feb. 13, 2013, 26 pages.
Non-Final Office Action received for U.S. Appl. No. 12/749,458, dated Jan. 13, 2016, 13 pages.
Final Office Action received for U.S. Appl. No. 12/749,458, dated Apr. 8, 2015, 36 pages.
Response to Final Office Action filed on Jun. 13, 2013 for U.S. Appl. No. 12/749,458, dated Feb. 13, 2013, 13 pages.
Response to Final Office Action filed on Jun. 8, 2015 for U.S. Appl. No. 12/749,458, dated Apr. 8, 2015, 25 pages.
Response to Non-Final Office Action filed n May 1, 2012 for U.S. Appl. No. 12/749,458, dated Feb. 3, 2012, 22 pages.
Response to Final Office Action filed on Apr. 15, 2013 for U.S. Appl. No. 12/749,458, dated Feb. 13, 2013, 15 pages.
Response to Non-Final Office Action filed on Dec. 30, 2014 for U.S. Appl. No. 12/749,458, dated Sep. 30, 2014, 17 pages.
Response to Non-Final Office Action filed on Oct. 18, 2012 for U.S. Appl. No. 12/749,458, dated Jul. 20, 2012, 19 pages.
Preliminary Amendment for U.S. Appl. No. 12/749,467, filed Oct. 25, 2010, 3 pages.
Preliminary Amendment for U.S. Appl. No. 12/749,467, filed Aug. 13, 2010, 4 pages.
Notice of Allowance received for U.S. Appl. No. 12/749,467, dated Jun. 14, 2017, 15 pages.
Response to Final Office Action filed on Dec. 30, 2015 for U.S. Appl. No. 12/749,467, dated Jul. 8, 2015, 32 pages.
Non-Final Office Action received for U.S. Appl. No. 12/749,467, dated Sep. 9, 2016, 13 pages.
Response to Non-Final Office Action filed on Apr. 1, 2015 for U.S. Appl. No. 12/749,467, dated Nov. 7, 2014, 18 pages.
Response to Non-Final Office Action filed on Jan. 9, 2017 for U.S. Appl. No. 12/749,467, dated Sep. 9, 2016, 17 pages.
Non-Final Office Action received for U.S. Appl. No. 12/749,467, dated Mar. 1, 2012, 20 pages.
Response to Non-Final Office Action filed on May 11, 2012 for U.S. Appl. No. 12/749,467, dated Mar. 1, 2012, 17 pages.
Final Office Action received for U.S. Appl. No. 12/749,467, dated Jul. 19, 2012, 23 pages.
Final Office Action received for U.S. Appl. No. 12/749,467, dated Jul. 8, 2015, 32 pages.
Final Office Action received for U.S. Appl. No. 12/749,467, dated Mar. 8, 2017, 14 pages.
Response to Final Office Action filed on May 23, 2017 for U.S. Appl. No. 12/749,467, dated Mar. 8, 2017, 17 pages.
Applicant Initiated Interview Summary received for U.S. Appl. No. 12/749,467, dated May 4, 2017, 3 pages.
Non-Final Office Action received for U.S. Appl. No. 12/749,467, dated May 8, 2014, 27 pages.
Response to Non-Final Office Action filed on Sep. 8, 2014 for U.S. Appl. No. 12/749,467, dated May 8, 2014, 16 pages.
Examiner Interview Summary received for U.S. Appl. No. 12/749,467, dated Jan. 17, 2017, 3 pages.
Response to Final Office Action filed on Sep. 18, 2012 for U.S. Appl. No. 12/749,467, dated Jul. 19, 2012, 19 pages.
Non-Final Office Action received for U.S. Appl. No. 13/011,374, dated Nov. 9, 2015, 16 pages.
Response to Non-Final Office Action filed on Mar. 9, 2016 for U.S. Appl. No. 13/011,374, dated Nov. 9, 2015, 18 pages.
Final Office Action received for U.S. Appl. No. 13/011,374, dated Apr. 1, 2016, 15 pages.
Response to Final Office Action filed on Sep. 30, 2016 for U.S. Appl. No. 13/011,374, dated Apr. 1, 2016, 29 pages.
Final Office Action received for U.S. Appl. No. 13/011,374, dated Jul. 15, 2013, 12 pages.
Response to Final Office Action filed on Sep. 16, 2013 for U.S. Appl. No. 13/011,374, dated Jul. 15, 2013, 9 pages.
Non-Final Office Action received for U.S. Appl. No. 13/011,374, dated Dec. 14, 2012, 12 pages.
Response to Non-Final Office Action filed on May 14, 2013 for U.S. Appl. No. 13/011,374, dated Dec. 14, 2012, 11 pages.
Advisory Action received for U.S. Appl. No. 13/011,374, dated Sep. 20, 2013, 3 pages.
Response Advisory Action filed on Oct. 17, 2013 for U.S. Appl. No. 13/011,374, dated Sep. 20, 2013, 9 pages.
Non-Final Office Action received for U.S. Appl. No. 13/011,374, dated Mar. 3, 2017, 10 pages.
Examiner Interview Summary received for U.S. Appl. No. 13/011,436, dated Oct. 16, 2015, 3 pages.
Final Office Action received for U.S. Appl. No. 13/011,436, dated Mar. 7, 2014, 13 pages.
Final Office Action received for U.S. Appl. No. 13/011,436, dated Jun. 24, 2015, 21 pages.

(56) References Cited

OTHER PUBLICATIONS

Non-Final Office Action received for U.S. Appl. No. 13/011,436, dated Jan. 14, 2015, 12 pages.
Non-Final Office Action received for U.S. Appl. No. 13/011,436, dated Jun. 20, 2013, 10 pages.
Non-Final Office Action received for U.S. Appl. No. 13/011,436, dated Jun. 24, 2016, 25 pages.
Response to Non-Final Office Action filed on May 14, 2015 for U.S. Appl. No. 13/011,436, dated Jan. 14, 2015, 27 pages.
Response to Restriction Requirement filed on May 20, 2013 for U.S. Appl. No. 13/011,436, dated May 14, 2013, 9 pages.
Response to Final Office Action filed on Jun. 9, 2014 for U.S. Appl. No. 13/011,436, dated Mar. 7, 2014, 9 pages.
Response to Non-Final Office Action filed on Nov. 20, 2013 for U.S. Appl. No. 13/011,436, dated Jun. 20, 2013, 11 pages.
Response to Non-Final Office Action filed on Dec. 21, 2015 for U.S. Appl. No. 13/011,436, dated Jun. 24, 2016, 24 pages.
Restriction Requirement received for U.S. Appl. No. 13/011,436, dated May 14, 2013, 6 pages.
Supplemental Amendment filed for U.S. Appl. No. 13/011,436, dated May 15, 2015, 5 pages.
Final Office Action received for U.S. Appl. No. 13/011,510, dated Mar. 19, 2012, 13 pages.
Response to Final Office Action filed on Aug. 20, 2012 for U.S. Appl. No. 13/011,510, dated Mar. 19, 2012, 13 pages.
Non-Final Office Action received for U.S. Appl. No. 13/011,510, dated Oct. 11, 2011, 13 pages.
Response to Non-Final Office Action filed on Jan. 9, 2012 for U.S. Appl. No. 13/011,510, dated Oct. 11, 2011, 10 pages.
Notice of Allowance received for U.S. Appl. No. 13/011,510, dated Nov. 15, 2012, 10 pages.
312 Amendment for U.S. Appl. No. 13/011,510, filed Feb. 14, 2013, 7 pages.
PTO Response to 312 Amendment for U.S. Appl. No. 13/011,510, dated Mar. 5, 2013, 2 pages.
Office Action received for European Patent Application No. 11755177.0, dated Apr. 19, 2017, 7 pages.
Office Action received for European Patent Application No. 11755177.0, dated Feb. 16, 2015, 5 pages.
Extended European Search Report received for European Patent Application No. 11755177.0, dated Dec. 23, 2015, 8 pages.
Response to Office Action filed on Aug. 19, 2015 for European Patent Application No. 11755177.0, dated Feb. 16, 2015, 9 pages.
Response to Extended European Search Report filed on Jun. 24, 2016 for European Patent Application No. 11755177.0, dated Dec. 23, 2015, 14 pages.
Examination Report received for Canadian Patent Application No. 2,804,052, dated Nov. 25, 2014, 3 pages.
Office Action received for Canadian Patent Application No. 2,804,052, dated Oct. 26, 2015, 3 pages.
Response to Examination Report filed on May 25, 2015 for Canadian Patent Application No. 2,804,052, dated Nov. 25, 2014, 20 pages.
Response to Office Action filed on Apr. 26, 2016 for Canadian Patent Application No. 2,804,052, dated Oct. 26, 2015, 3 pages.
First Examination Report received for Australian Patent Application No. 2011299401, dated Sep. 27, 2013, 3 pages.
Response to First Examination Report filed on Mar. 5, 2014 for Australian Patent Application No. 2011299401, dated Sep. 27, 2013, 16 pages.
Office Action received for Chinese Patent Application No. 201180033079.2, dated Jun. 2, 2016, 13 pages.
Office Action received for Chinese Patent Application No. 201180033079.2, dated Dec. 22, 2015, 22 pages.
Response to Office Action filed on Apr. 23, 2016 for Chinese Patent Application No. 201180033079.2, dated Dec. 22, 2015, 21 pages.
Response to Office Action filed on Aug. 26, 2016 for Chinese Patent Application No. 201180033079.2, dated Jun. 2, 2016, 67 pages.
Office Action received for Russian Patent Application No. 2012155513, dated Jul. 16, 2015, 7 pages.
First Examination Report received for Australian Patent Application No. 2014206199, dated Feb. 26, 2016, 5 pages.
Response to First Examination Report filed on Jun. 27, 2016 for Australian Patent Application No. 2014206199, dated Feb. 26, 2016, 17 pages.
Office Action received for Russian Patent Application No. 2016117291, dated Mar. 29, 2017, 12 pages.
International Written Opinion received for PCT Patent Application No. PCT/US2011/049444, dated Nov. 18, 2014, 5 pages.
International Search Report received for PCT Patent Application No. PCT/US2011/049444, dated Nov. 18, 2014, 2 pages.
International Preliminary Report on Patentability received for PCT Patent Application No. PCT/US2011/049444, dated Dec. 4, 2014, 7 pages.
International Search Report received for PCT Patent Application No. PCT/US2011/049449, dated Jan. 19, 2012, 2 pages.
International Written Opinion received for PCT Patent Application No. PCT/US2011/049449, dated Jan. 19, 2012, 6 pages.
International Preliminary Report on Patentability received for PCT Patent Application No. PCT/US2011/049449, dated Mar. 14, 2013, 7 pages.
International Search Report received for PCT Patent Application No. PCT/US2011/049454, dated Nov. 28, 2014, 2 pages.
International Written Opinion received for PCT Patent Application No. PCT/US2011/049454, dated Nov. 28, 2014, 5 pages.
International Preliminary Report on Patentability received for PCT Patent Application No. PCT/US2011/049454, dated Jan. 8, 2015, 7 pages.
Admiral, "Reflecting on the History of Customer Service", Retrieved from the Internet URL:<http://www.admiralmetals.com/wp-content/uploads/2014/2015-03-30-ReflectingHistoryCustomerService.pdf>, Accessed on Mar. 26, 2015, 2 pages.
Macys, "www.macys.com", Retrieved Online from the Internet URL:<https://www.macys.com/>, Accessed on Dec. 31, 2010, 9 pages.
Silhouette, "Dictionary.com", Retrieved from Internet<http://dictionary.reference.com/browse/silhouette?s=t>, Jan. 24, 2013, pp. 1-2.
"Japan's Amana Web Site Will Boast Graphi-Based Image Search", Dec. 15, 2006, 2 pages.
Shop It to Me, "Shop it to Me: About Us", Retrieved from the Internet: <URL: http://www.shopittome.com/aboutus>, Accessed on Nov. 13, 2010, 2 pages.
First Action Interview—Office Action Summary received for U.S. Appl. No. 15/656,410, dated Jun. 4, 2019, 8 pages.
Response to First Action Interview Office Action filed on Jul. 16, 2019, for U.S. Appl. No. 15/656,410, dated Jun. 4, 2019, 8 pages.
Supplemental Amendment filed on Jul. 31, 2019, for U.S. Appl. No. 15/656,410, 8 pages.
Restriction Requirement received for U.S. Appl. No. 13/691,390, dated Feb. 26, 2015, 9 pages.
First Examiner Report received for Australian Patent Application No. 2012318961, dated Mar. 5, 2015, 3 pages.
Response to Non-Final Office Action filed on Apr. 6, 2015 for U.S. Appl. No. 14/133,455, dated Dec. 5, 2014, 9 pages.
Response to Final Office Action filed on Apr. 27, 2015 for U.S. Appl. No. 13/073,926, dated Feb. 26, 2015, 25 pages.
Notice of Allowance received for U.S. Appl. No. 14/133,455, dated Apr. 27, 2015, 6 pages.
Advisory Action received for U.S. Appl. No. 13/073,926, dated May 5, 2015, 3 pages.
Response to Advisory Action filed on May 26, 2015, for U.S. Appl. No. 13/073,926, dated May 5, 2015, 23 pages.
Corrected Notice of Allowance received for U.S. Appl. No. 14/133,455, dated Jun. 4, 2015, 4 pages.
Response to First Examiner Report filed on Jun. 15, 2015, for Australian Patent Application No. 2012318961, dated Mar. 5, 2015, 25 pages.
Subsequent Examiner Report received for Australian Patent Application No. 2012318961, dated Jul. 21, 2015, 3 pages.
Office Action received for Korean Patent Application No. 10-2014-7012145, dated Jul. 22, 2015, 7 pages (With English Claims).
Non-Final Office Action received for U.S. Appl. No. 13/073,926, dated Aug. 18, 2015, 19 pages.

(56) References Cited

OTHER PUBLICATIONS

Notice of Allowance received for U.S. Appl. No. 14/133,455, dated Sep. 24, 2015, 6 pages.
Office Action received for Canadian Patent Application No. 2,849,970, dated Oct. 5, 2015, 3 pages.
Response to Office Action filed on Oct. 22, 2015 for Korean Patent Application No. 10-2014-7012145, dated Jul. 22, 2015, 20 pages (With English Claims).
Office Action received for Chinese Patent Application No. 201180033079.2, dated Dec. 22, 2015, 11 pages (With English Translation).
Response to Subsequent Examiner Report filed on Jan. 22, 2016 for Australian Patent Application No. 2012318961, dated Jul. 21, 2015, 18 pages.
Response to Non-Final Office Action filed on Feb. 17, 2016 for U.S. Appl. No. 13/073,926, dated Aug. 18, 2015, 26 pages.
Response to Office Action filed on Mar. 21, 2016 for Canadian Patent Application No. 2,849,970, dated Oct. 5, 2015, 16 pages.
Notice of Allowance received for U.S. Appl. No. 13/073,926, dated Mar. 22, 2016, 14 pages.
Non-Final Office Action received for U.S. Appl. No. 14/329,837, dated Apr. 8, 2016, 7 pages.
Office Action received for Chinese Patent Application No. 201280059512.4, dated May 27, 2016, 10 pages (Without English Translation).
Response to Non-Final Office Action filed on May 31, 2016 for U.S. Appl. No. 14/329,837, dated Apr. 8, 2016, 15 pages.
Office Action received for Korean Patent Application No. 10-2016-7009512, dated Jun. 1, 2016, 9 pages (With English Claims).
Notice of Allowance received for U.S. Appl. No. 14/329,837, dated Jun. 21, 2016, 7 pages.
Applicant Initiated Interview Summary received for U.S. Appl. No. 12/749,467, dated Aug. 12, 2015, 3 pages.
Non-Final Office Action received for U.S. Appl. No. 12/749,467, dated Nov. 7, 2014, 24 pages.
Applicant Interview Summary received for U.S. Appl. No. 13/011,374, dated May 12, 2016, 3 pages.
Applicant Initiated Interview Summary received for U.S. Appl. No. 13/852,879, dated Feb. 28, 2017, 3 pages.
Corrected Notice of Allowability received for U.S. Appl. No. 13/852,879, dated May 1, 2017, 7 pages.
Examiner Initiated Interview Summary received for U.S. Appl. No. 13/852,879, dated May 1, 2017, 1 page.
Non-Final Office Action received for U.S. Appl. No. 13/852,879, dated Nov. 10, 2016, 13 pages.
Notice of Allowance received for U.S. Appl. No. 13/852,879, dated Apr. 18, 2017, 7 pages.
Notice of Allowance received for U.S. Appl. No. 13/852,879, dated Aug. 25, 2017, 7 pages.
Response to Non-Final Office Action filed on Mar. 10, 2017 for U.S. Appl. No. 13/852,879, dated Nov. 10, 2016, 17 pages.
Notice of Allowance received for Canadian Patent Application No. 2,804,052, dated Sep. 8, 2016, 1 page.
Notice of Acceptance received for Australian Patent Application No. 2011299401, dated Apr. 17, 2014, 2 pages.
Notice of Allowance received for Russian Federation Application No. 2012155513, dated Feb. 10, 2016, 12 pages (9 pages of Official Copy and 3 pages of English Claims).
Response to Office Action filed on Dec. 28, 2015 for Russian Federation Patent Application No. 2012155513, dated Jul. 16, 2015, 7 pages (Official Copy Only).
Notice of Acceptance received for Australian Patent Application No. 2014206199, dated Aug. 12, 2016, 2 pages.
Non-Final Office Action received for U.S. Appl. No. 13/624,599, dated Dec. 24, 2015, 23 pages.
Response to Non-Final Office Action filed on May 24, 2016 for U.S. Appl. No. 13/624,599, dated Dec. 24, 2015, 16 pages.
Final Office Action received for U.S. Appl. No. 13/624,599, dated Apr. 24, 2015, 19 pages.

Response to Final Office Action filed on Jun. 24, 2015 for U.S. Appl. No. 13/624,599, dated Apr. 24, 2015, 22 pages.
Non-Final Office Action received for U.S. Appl. No. 13/624,599, dated Jun. 6, 2014, 17 pages.
Final Office Action received for U.S. Appl. No. 13/624,599, dated Jun. 14, 2016, 26 pages.
Response to Non-Final Office Action filed on Nov. 17, 2014 for U.S. Appl. No. 13/624,599, dated Jul. 17, 2014, 17 pages.
Advisory Action received for U.S. Appl. No. 13/624,599, dated Jul. 17, 2015, 5 pages.
Rosenberg et al., "Query Image Search", U.S. Appl. No. 61/171,000, filed Apr. 20, 2009, 79 pages.
Clippard et al., "Automatic Method to Generate Product Attributes Based Solely on Product Images", U.S. Appl. No. 61/250,326, filed Oct. 9, 2009, 96 pages.
Preliminary Amendment filed for U.S. Appl. No. 12/749,467, filed Aug. 9, 2010, 7 pages.
Wikipedia, "The Watershed Transformation", Accessed on Jul. 3, 2018, 11 pages.
Meyer et al., "Multiscale Morphological Segmentations Based on Watershed, Flooding, and Eikonal PDE", Scale-Space '99, LNCS 1682, 1999, pp. 351-362.
Non-Final Office Action received for U.S. Appl. No. 10/979,604, dated Dec. 20, 2010, 24 pages.
Response to Non-Final Office Action filed on Jul. 19, 2010, for U.S. Appl. No. 12/423,655, dated Mar. 19, 2010, 11 pages.
Huang et al., "Segmentation of Color Textures Using K-Means Cluster Based Wavelet Image Fusion", Applied Mechanics and Materials, Jan. 12, 2010, pp. 209-214.
International Search Report received for PCT Application No. PCT/US2012/057110, dated Nov. 30, 2012, 2 pages.
Written Opinion received for PCT Application No. PCT/US2012/057110, dated Nov. 30, 2012, 5 pages.
Non-Final Office Action received for U.S. Appl. No. 13/073,936, dated May 16, 2013, 13 pages.
Non-Final Office Action received for U.S. Appl. No. 13/073,926, dated May 21, 2013, 16 pages.
Preliminary Amendment received for U.S. Appl. No. 13/852,879, filed Jun. 26, 2013, 8 pages.
Notice of Allowance received for U.S. Appl. No. 13/073,911, dated Jul. 19, 2013, 8 pages.
"Moovit-Real-Time Transit Info—Android Apps on Google Play", Accessed on Jul. 24, 2013, 2 pages.
"Wondering How TSO Mobile & GPS Tracking Benefit Passengers and the Public Transportation Industry?", Retrieved from the Internet: URL: <http://www.tsomobile.com/tso-mobile-public-transportation/>, Aug. 2014, 2 pages.
312 Amendment filed for U.S. Appl. No. 13/073,911, filed Aug. 1, 2013, 9 pages.
Response to Non-Final Office Action filed on Aug. 21, 2013, for U.S. Appl. No. 13/073,926, dated May 21, 2013, 13 pages.
Response to Non-Final Office Action filed on Sep. 16, 2013, for U.S. Appl. No. 13/073,936, dated May 16, 2013, 11 pages.
Notice of Allowance received for U.S. Appl. No. 13/073,911, dated Sep. 18, 2013, 6 pages.
Corrected Notice of Allowance received for U.S. Appl. No. 13/073,911, dated Oct. 2, 2013, 2 pages.
312 Amendment filed for U.S. Appl. No. 13/073,911, filed Oct. 8, 2013, 12 pages.
Final Office Action received for U.S. Appl. No. 13/073,926, dated Oct. 17, 2013, 13 pages.
PTO Response to Rule 312 Amendment for U.S. Appl. No. 13/073,911, dated Oct. 23, 2013, 2 pages.
Rui et al., "A Novel Relevance Feedback Technique in Image Retrieval", In Proceedings of the seventh ACM International conference on Multimedia, Oct. 1999, pp. 67-70.
Final Office Action received for U.S. Appl. No. 13/073,936, dated Oct. 30, 2013, 12 pages.
Response to Final Office Action filed on Jan. 17, 2014 for U.S. Appl. No. 13/073,926, dated Oct. 17, 2013, 15 pages.
Notice of Allowance received for U.S. Appl. No. 13/073,911, dated Jan. 21, 2014, 5 pages.

(56) References Cited

OTHER PUBLICATIONS

Preliminary Amendment received for U.S. Appl. No. 14/133,455, filed Jan. 24, 2014, 10 pages.
Invitation to Pay Additional Fees and Partial Search Report PCT Application No. PCT/US2013/072339, dated Feb. 14, 2014, 2 pages.
Response to Final Office Action filed on Feb. 28, 2014 for U.S. Appl. No. 13/073,936, dated Oct. 30, 2013, 14 pages.
Non-Final Office Action received for U.S. Appl. No. 13/073,936, dated Apr. 4, 2014, 9 pages.
International Preliminary Report on Patentability received for PCT Application No. PCT/US2012/057110, dated Apr. 17, 2014, 7 pages.
Written Opinion received for PCT Application No. PCT/US2013/072339, dated Apr. 28, 2014, 5 pages.
International Search Report received for PCT Application No. PCT/US2013/072339, dated Apr. 28, 2014, 5 pages.
Notice of Allowance received for U.S. Appl. No. 13/073,911, dated Jun. 10, 2014, 5 pages.
Wikipedia, "Recommender System", Accessed on Jul. 10, 2014, 8 pages.
312 Amendment filed for U.S. Appl. No. 13/073,911, filed Jul. 14, 2014, 9 pages.
Preliminary Amendment received for U.S. Appl. No. 14/329,837, filed Jul. 15, 2014, 10 pages.
Non-Final Office Action received for U.S. Appl. No. 13/073,926, dated Jul. 15, 2014, 18 pages.
312 Amendment filed for U.S. Appl. No. 13/073,911, dated Jul. 24, 2014, 2 pages.
Response to Non-Final Office Action filed on Jul. 25, 2014, for U.S. Appl. No. 13/073,936, dated Apr. 4, 2014, 10 pages.
Final Office Action received for U.S. Appl. No. 13/073,936, dated Aug. 4, 2014, 9 pages.
Response to Final Office Action filed on Sep. 12, 2014 for U.S. Appl. No. 13/073,936, dated Aug. 4, 2014, 10 pages.
Examiner Initiated Interview Summary received for U.S. Appl. No. 13/073,936, dated Sep. 15, 2014, 3 pages.
Notice of Allowance received for U.S. Appl. No. 13/073,936, dated Sep. 24, 2014, 5 pages.
Response to Non-Final Office Action filed on Nov. 17, 2014 for U.S. Appl. No. 13/073,926, dated Jul. 15, 2014, 15 pages.
Non-Final Office Action received for U.S. Appl. No. 14/133,455, dated Dec. 5, 2014, 6 pages.
Voluntary Amendment received for Chinese Patent Application No. 201280059512.4, filed on Dec. 23, 2014, 17 pages with English Translation of Claims).
Final Office Action received for U.S. Appl. No. 13/073,926, dated Feb. 26, 2015, 25 pages.
First Action Interview Office Action Summary received for U.S. Appl. No. 15/655,003, dated Mar. 3, 2020, 9 pages.
Silhouette, "Define Silhouette at Dictionary.com" https://www.dictionary.com/browse/silhouette?s=t, Accessed on Jul. 13, 2012, pp. 1-2.
Office Action Received for Chinese Patent Application No. 201611209571.1, dated Mar. 24, 2020, 10 pages (6 pages of Official Copy and 4 pages of English Translation).
First Action Interview Pre-Interview Communication received for U.S. Appl. No. 15/655,003, dated Oct. 29, 2019, 8 pages.
Notice of Allowance received for U.S. Appl. No. 15/656,410, dated Aug. 30, 2019, 7 pages.
Response to First Action Interview Pre-Interview Communication filed on Nov. 26, 2019, for U.S. Appl. No. 15/655,003, dated Oct. 29, 2019.
Response to Office Action filed on Apr. 16, 2020 for Chinese Patent Application No. 201611209571.1, dated Mar. 24, 2020, 7 pages (4 pages of Official Copy & 3 pages of English Pending Claims).
Office Action received for Chinese Patent Application No. 201611209571.1, dated May 28, 2020, 12 pages (5 pages of Official Copy & 7 pages of English Translation).
Response to Office Action filed on Aug. 11, 2020, for Chinese Patent Application No. 201611209571.1 dated May 20, 2020, 9 pages (5 pages of Official Copy & 4 pages of English Pending Claims).
Non-Final Office Action Received for U.S. Appl. No. 16/707,467, dated Mar. 4, 2021, 10 pages.
Decision of Rejection received for Chinese Patent Application No. 201611209571.1 dated Feb. 5, 2021, 2 Pages (1 page of Official Copy & 1 page of English Translation).
U.S. Appl. No. 61/171,000, "Query image search" filed Apr. 20, 2009, 80 Pages.
U.S. Appl. No. 61/250,326, "Automatic method to generate product attributes based solely on product images" filed Oct. 9, 2009, 100 Pages.
Notice of Allowance Received for U.S. Appl. No. 16/707,467, dated May 12, 2021, 8 pages.
Advisory Action Received for U.S. Appl. No. 15/655,003, dated Nov. 3, 2020, 3 pages.
Final Office Action received for U.S. Appl. No. 15/655,003, dated Aug. 17, 2020, 20 pages.
Non-Final Office Action received for U.S. Appl. No. 15/655,003, dated Jan. 21, 2021, 23 Pages.
Final Office Action received for U.S. Appl. No. 15/655,003, dated Jun. 30, 2021, 11 pages.
Corrected Notice of Allowability received for U.S. Appl. No. 16/707,467, dated Aug. 13, 2021, 2 pages.
TheFind.com Launches Next-Generation Shopping Search Engine that Helps Consumers Find Any Product Sold Online; TheFind.com Strives to Search Every Online Store to Deliver Unbiased, Relevant Shopping Search Results, PR Newswire (New York), Oct. 31, 2006, 3 Pages.
Notice of Allowability Received for U.S. Appl. No. 15/655,003, dated Feb. 3, 2022, 2 Pages.
Notice of Allowance Received for U.S. Appl. No. 15/655,003, dated Jan. 7, 2022, 17 pages.
Boshoff et al., "The mediating effect of brand image and information search intentions on the perceived risks associated with online purchasing on a generically-branded website", Management Dynamics 18.4: 18-28, 2009 9 Pages.

* cited by examiner

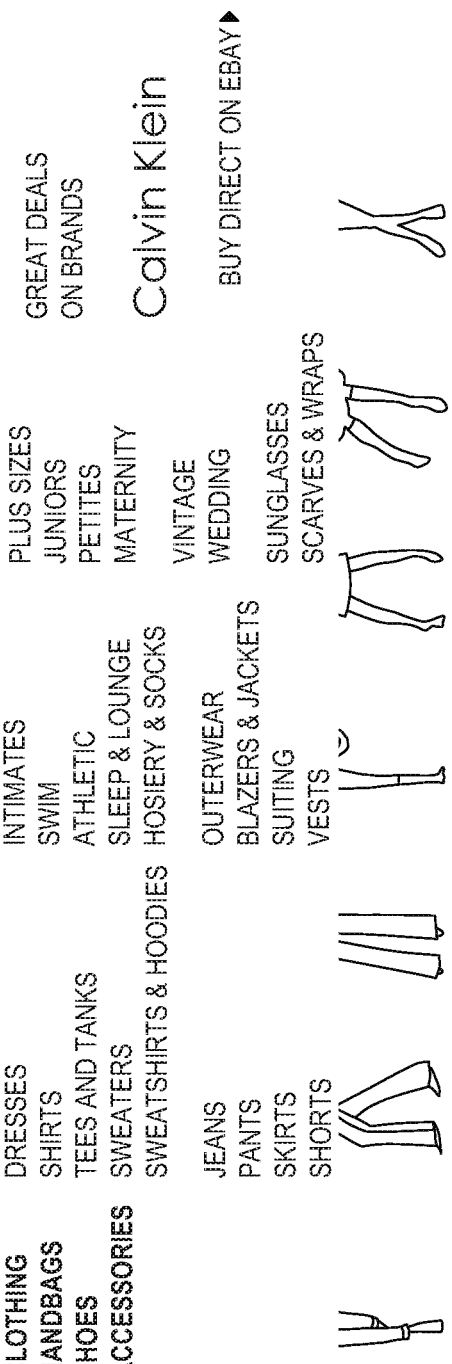
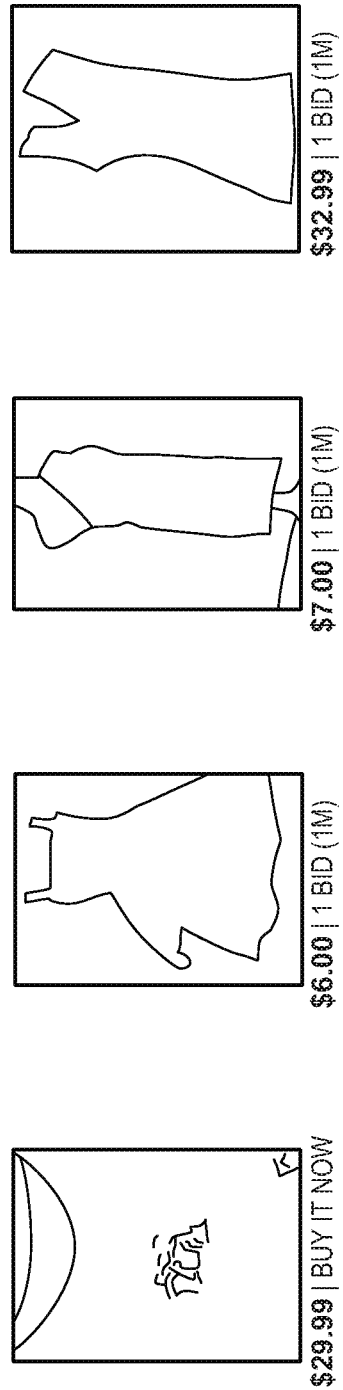
FIG. 3

FIG. 4A

FASHION SHOPPING PROFILE

SAVE YOUR SIZE, FAVORITE BRANDS & OTHER PREFERENCES SO YOU CAN REUSE EASILY

[CREATE NEW PROFILE]

BRAND
- POPULAR
- ALL
- 7 FOR ALL MANKIND
- ABERCROMBIE & FITCH
- AEROPOSTALE
- AMERICAN EAGLE
- ANN TAYLOR
- ANTHROPOLOGIE
- BCBG MAX AZRIA
- BANANA REPUBLIC
- BEBE
- BETSEY JOHNSON

CHOOSE MORE BRANDS

PRICE
$ [____] TO $ [____]

CONDITION
- NEW
- USED
- NOT SPECIFIED

FORMAT
- AUCTION
- BUY IT NOW

SELLER
- EBAY TOP RATED SELLERS
- EBAY STORE SELLERS

FIG. 5 ebaY
WELCOME! SIGN IN OR REGISTER.                     MY EBAY | SELL | COMMUNITY | CONTACT US | HELP

[SEARCH] ADVANCED SEARCH ▶
CATEGORIES ▶  WOMEN'S CLOTHING
WOMEN ▶ MEN ▶ KIDS & BABY ▶ FASHION ▶ MOTORS DAILY DEALS CLASSIFIEDS
BRANDS ▶ FASHION*VAULT* FASHION*VOICE*

WOMEN'S CLOTHING                    TELL US WHAT YOU THINK SHARE    LIKE  66

DRESSES
501
SHOW ALL

LENGTH
ABOVE KNEE, MINI | FULL LENGTH | KNEE-LENGTH | MID-CALF

SLEEVE
3/4 SLEEVE | CAP SLEEVE | HALTER | KIMONO SLEEVE | LONG SLEEVE | OFF SHOULDER | ONE SHOULDER   >

659,494 RESULTS FOUND              1 2 3 4 5 > GO TO SEARCH RESULTS $29.99 | BUY IT NOW    $6.00 | 1 BID (1M)    $7.00 | 1 BID (1M)    $32.99 | 1 BID (1M)

*FIGURE 5A INTERFACE*

599

FASHION SHOPPING PROFILE

SAVE YOUR SIZE, FAVORITE BRANDS & OTHER PREFERENCES SO YOU CAN REUSE EASILY

| CREATE NEW PROFILE | ~521

SIZE — 523

| REGULAR | PLUS | PETITES | JUNIORS |
| XXS | XS | S | M | L | XL | XXL |
| 00 | 0 | 4 | 8 | 12 | 16 | 20 |
| 2 | 6 | 10 | 14 | 18 | 22 |

| ONE SIZE |

BRAND
 POPULAR
 ALL
 A.B.S.
 ADRIANNA PAPELL
 ANN TAYLOR
 ANTHROPOLOGIE
 BCBG MAX AZRIA
 BANANA REPUBLIC
 BEBE
 BETSEY JOHNSON
 COLDWATER CREEK

CHOOSE MORE BRANDS

PRICE
$ [     ] TO $ [     ]

CONDITION
 NEW
 USED
 NOT SPECIFIED

FORMAT
 AUCTION
 BUY IT NOW

SELLER
 EBAY TOP RATED SELLERS
 EBAY STORE SELLERS

FIG. 5A

FIG. 6
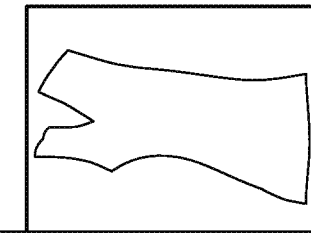
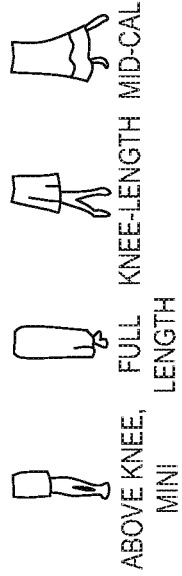
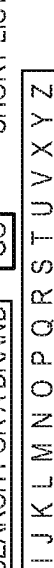

FIG. 8

FASHION SHOPPING PROFILE - CREATE AND EDIT YOUR PREFERENCES

[_____] WOMEN'S CLOTHING [SEARCH]

NEW PROFILE
BUYING FOR: [_____803_____] [___801___ WOMAN]

SIZE FOR:
TOPS(KNITS & WOVEN), SWEATERS, TEES, TANKS, CASUAL JACKETS, OUTERWEAR, BLAZERS, SUITS, DRESSES

REGULAR [PLUS] [PETITES] [JUNIORS]
ALPHA SIZE [XXS] [XS] [S] [M] [L] [XL] [XXL]
OR NUMERICS [00] [0] [4] [8] [12] [16] [20]
[2] [6] [10] [14] [18] [22]

BOTTOMS: TROUSERS, PANTS, SHORTS, SKIRTS, JEANS

805
WAIST SIZE [23] [24] [25] [26] [27] [28]
[29] [30] [31] [32] [33]
INSEAM [20] [21] [22] [23] [24] [25] [26]
[27] [28] [29] [30] [31]

SHOES: PUMPS, SANDALS, BOOTS

807
SHOE SIZE [SHOE WIDTH]
[4] [4 1/2] [5] [5 1/2] [6] [6 1/2] [7] [7 1/2]
[8] [8 1/2] [9] [9 1/2] [10] [10 1/2] [11] [11 1/2]
[12] [12 1/2] [13] [13 1/2] [14] [14 1/2] [15]

SHOW INTIMATES: BRAS AND PANTIES

CONDITION: ☐ NEW  ☐ USED  ☐ NOT SPECIFIED     FORMAT: ☐ AUCTION  ☐ BUY IT NOW

FAVORITE BRANDS: ALL BRANDS (A-Z)
809

[SEARCH FOR A BRAND] [GO]     FAVORITES

A B C D E F G H I J K L M N O P Q R S T U V X Y Z
☐ "HANDMADE"
☐ 525 AMERICA
811
☐ 7 FOR ALL MANKIND
☐ A BATHING APE
☐ A. MARINELLI
☐ A.B.S.
☐ A.P.C.O.
☐ A.P.N.Y.
☐ ABERCROMBIE & FITCH

SELECT BRANDS FROM THE LEFT TO ADD TO YOUR FAVORITES

[DONE]

800

MULTILEVEL SILHOUETTES IN AN ONLINE SHOPPING ENVIRONMENT

RELATED APPLICATIONS

This application is a continuation of and claims the benefit of priority to U.S. patent application Ser. No. 13/852,879, filed on Mar. 28, 2013, which is a continuation of and claims the benefit of priority to U.S. patent application Ser. No. 13/011,510, filed on Jan. 21, 2011, which claims the benefit of priority to U.S. Provisional Patent Application Ser. No. 61/377,914 filed Aug. 28, 2010, the benefit of priority of each of which is claimed hereby, and each of which are incorporated by reference herein in its entirety.

TECHNICAL FIELD

The present disclosure generally relates to data processing techniques. More specifically, the present disclosure relates to methods and systems for displaying, at a user interface, item listings for the user to select from for querying the system, in order to enable the system to return to the user images of the type of item desired by the user for possible purchase.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various transaction methods, and still others are offered via a system of classified ad listings. Some enterprises specialize in the selling of a specific category of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, when a buyer selects from a user interface an item of interest by textual name of that item, a selection error can occur. That is, the buyer might select the incorrect name of the product, such as selecting a clutch handbag when an evening handbag is really desired. Preventing that error and providing the buyer with an image of the precise type of item he or she is looking for enhances the buyer's experience and is more likely to lead to an executed transaction.

DESCRIPTION OF THE DRAWINGS

Some embodiments are illustrated by way of example and not limitation in the figures of the accompanying drawings, in which:

FIG. 3 illustrates an example of a fashion related page on an e-commerce system website.

FIG. 4A illustrates a navigation pane useable with FIG. 4, as illustrated at the left of FIG. 4.

FIG. 5 illustrates an example of operation of a sliding silhouette that uncovers multiple silhouettes for item selection.

FIG. 5A illustrates a navigation pane useable with FIG. 5, as illustrated at the left of FIG. 5.

FIG. 6 illustrates an example of a layer that can open when a button that asks for additional brands is clicked, the brands then being viewable and selectable.

FIG. 8 illustrates a window for creating shopping profiles for later use.

DETAILED DESCRIPTION

Methods and systems for displaying, at a user interface, item listings for the user to select from for querying the system, in order to enable the system to return to the user interface item listings of the type desired by the user for possible purchase. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
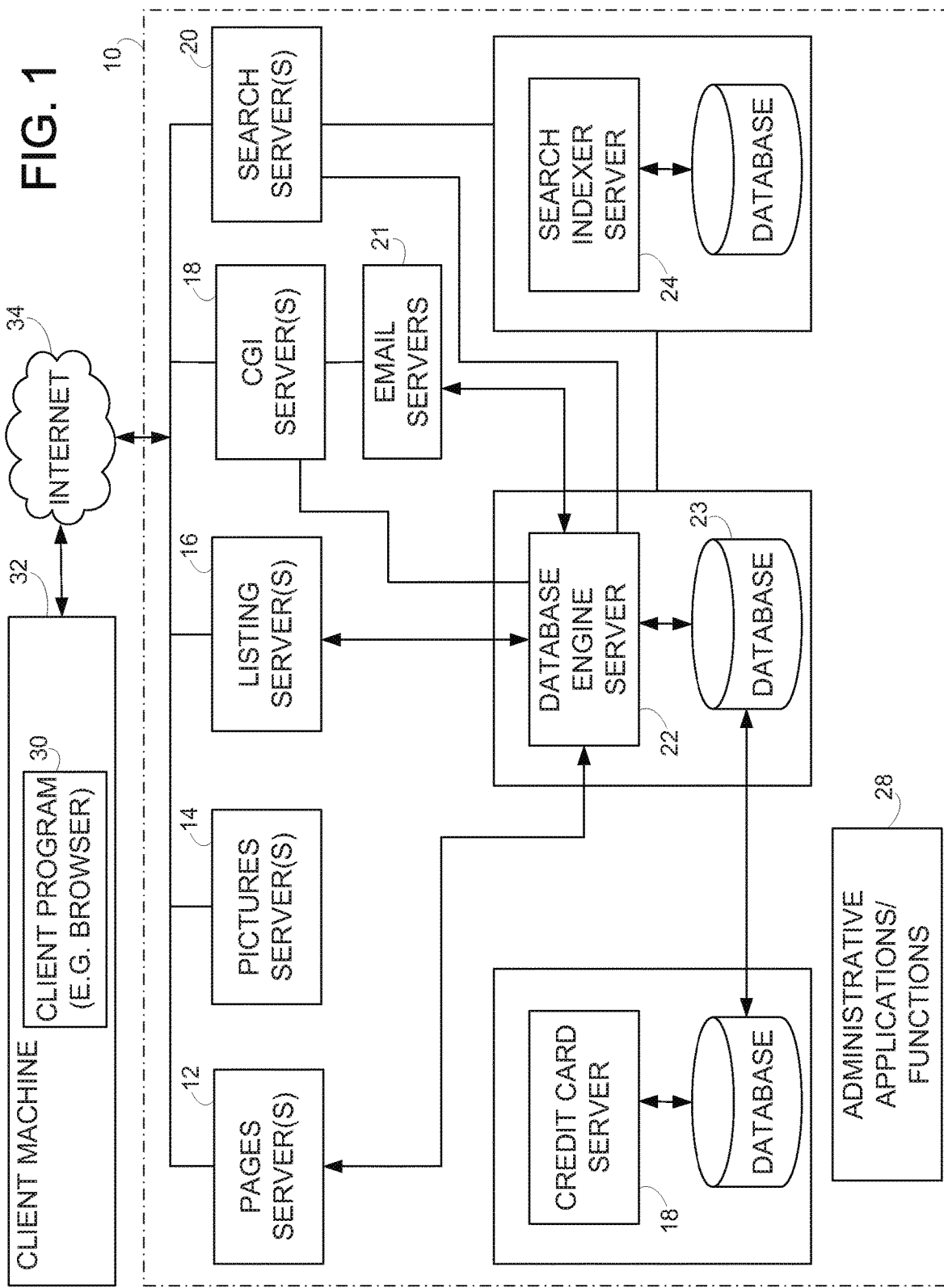
FIG. 1 is a block diagram of a network environment including a network-connected client system and server system, with which an embodiment of the invention might be implemented.
Figure 2:
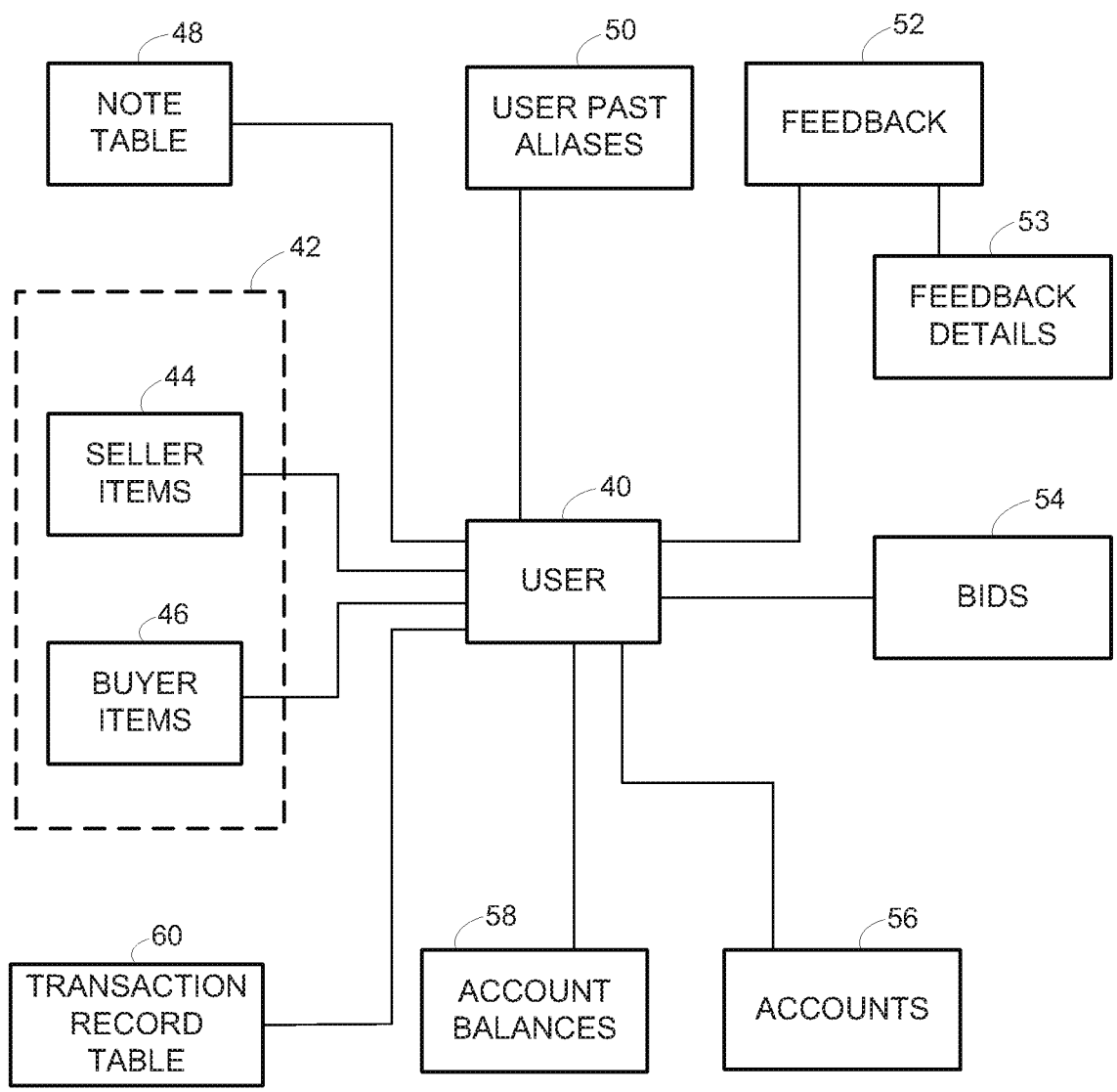
FIG. 2 illustrates is a database diagram illustrating an exemplary database for the transaction facility.

To better understand the invention, an embodiment of an electronic transaction facility is shown in FIGS. 1 and 2.

FIG. 1 is a block diagram illustrating an exemplary network-based transaction facility in the form of an Internet-based transaction facility 10. While an exemplary embodiment of the present invention is described within the context of an transaction facility, it will be appreciated by those skilled in the art that the invention will find application in many different types of computer-based, and network-based, commerce facilities. It will also be appreciated by those skilled in the art that the invention may be used in transaction facilities of other architectures. The instructions stored in the transaction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The transaction facility 10 within which an embodiment can be implemented includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of transaction facility 10, and search servers 20 that handle search requests to the transaction facility 10. E-mail servers 21 provide, inter alia, automated e-mail communications to users of the transaction facility 10.

The back-end servers include a database engine server 22, a search index server 24 and a credit card database server 26, each of which maintains and facilitates access to a respective database.

The Internet-based transaction facility 10 may be accessed by a client program 30, such as a browser (e.g., the Internet Explorer distributed by Microsoft Corp. of Redmond Wash.) that executes on a client machine 32 and accesses the transaction facility 10 via a network such as, for example, the Internet 34. Other examples of networks that a client may utilize to access the transaction facility 10 include a wide area network (WAN), a local area network (LAN), a wireless network (e.g. a cellular network), or the Plain Old Telephone Service (POTS) (or PSTN) network.
Database Structure FIG. 2 is a database diagram illustrating an exemplary database 23, maintained by and accessed via the database engine server 22, which at least partially implements and supports the transaction facility 10. The database 23 may, in one embodiment, be implemented as a relational database, and includes a number of tables having entries, or records, that are linked by indices and keys. In an alternative embodiment, the database 23 may be implemented as a collection of blocks in a block-oriented database. While FIG. 2 shows one embodiment of a database, it will be appreciated by those skilled in the art that the invention can be used with other database structures.

Central to the database 23 is a user table 40, which contains a record for each user of the transaction facility 10. A user may operate as a seller, buyer, or both, within transaction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned or otherwise marketed via the transaction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40.

Each note record within the note table 48 may include, inter alia, a comment, description, history or other information pertaining to an item being auctioned or otherwise sold via the transaction facility 10 or to a user of the transaction facility 10.

A number of other tables are also shown to be linked to the user table 40, namely a user past aliases table 50, a feedback table 52, a bids table 54, an accounts table 56, and an account balances table 58.

The on-line trading system includes a user interface which may the browser 30 whereby a user can enter select a search term describing an item the user is interested in seeing for possible purchase. Usually a buyer would like to browse a category of images, for example hand bags, by style and/or brand so that the user can quickly find something interesting to the buyer. The buyer selects one of the choices for the desired item and images of one or more of the category of item selected from the choices are returned for the buyer to see for possible purchase. For instance, a number of product type can be presented via the user interface by name, such as shoes, handbags, clothes, and the like. If the category of item the user desires is a handbag, the handbag selection presented to the buyer in textual form by the user interface might be the words "clutch," "evening bag," "messenger style," and "satchel," among others. It could occur that the user might confuse, as one example, "clutch" with "evening bag" and enter "clutch" as the category of bag desired when the user is actually looking for an evening bag. This would result in one or more images of a clutch being returned to the user, when the user actually wanted one or more images of an evening bag image to be returned. Thus the item image being returned to the user that is not the actual category of item the user desires, and the user's experience is therefore less than optimum. This in itself may result in the transaction not being executed.

If, on the other hand, the selection presented to the user is in visual form, such as a silhouette of the product, then there is much less room for error. The user will see an image of the category of handbag. Using the example next above, the user would see images of "clutch," "evening bag," "messenger style," and "satchel." This could be, for example, presented by brand. The user could then, as only one example of an embodiment, mouseover each image to display the name of each of the various types of handbag offered for each image. Mouseover is a well known function and an example, taken from Wikipedia, is seen in the appendix to this specification. The user could then click on the bag of the user's choice to view possible attributes of the bag such as styling, color and fabric, among others. Since the buyer will see images of the category of bag desired, with very little opportunity for error, the experience is more nearly optimum, and a transaction is more likely to be executed. This can be implemented, in one embodiment, by the images of types of handbags being presented to the user in silhouette so that the users could, for example, mouseover the silhouette image that is most like the category of bag desired and the title of the bag would be presented. For example, the user interface can present the prospective buyer with silhouettes of a clutch, an evening bag, a messenger style bag, and a satchel, among others. Seeing the silhouette images, the buyer can mouseover them for the name and simply select the silhouette of the category of bag desired, for example an evening bag, and the system displays the types of evening bags offered for sale. One of ordinary skill in the art will see that the displaying the title is not necessary for the invention. The user might just select the silhouette based on recognizing the silhouette. In this manner in which a buyer can find products or services which they wish to purchase.

In response to the selection, information, including images and attributes of the selected silhouette can then be returned to the user interface for the user. In one embodiment this is accomplished by the system mapping the selected evening bag image information of this example to a textual value and making a query to the transaction facility 10 which will undertake a search using the query and will then obtain and return the foregoing image and attributes. In another embodiment, attributes of the images can be returned separately for presentation to the user by way of the user interface. The presentation of a silhouette of a category of product to the buyer, since it is visual, drastically reduces the opportunity for error, or error rate, makes the buyer's experience more nearly optimum, and is more likely to result in an executed transaction.

As another example, if the buyer is interested in women's shoes, various type of women's shoes will be presented in silhouette, such as high heels, pumps, flats, sandals, and the like. The user mouses over the silhouettes, again to display the name, —as only one example, and clicks to select the category of shoe of interest from the silhouettes, for example, high heels. High heel shoes of various types and attributes can be returned to the buyer for possible purchase, much the same way handbags were returned in the above example. The various types of heels could be three-inch heels stilettos, Cuban heels, and the like. Attributes could be fabric, color, size, price and availability, among others can be displayed for the user.

In some embodiments, a user operates a web browser application 30 on a client machine 32 to interact with the transaction facility 10. A user may be presented with a search interface on client browser 30, with items in silhouette, as described generally above, and in more detail below, from which the user can select an item to be used in generating a search request submitted to the transaction facility. In some embodiments users themselves may be able to select certain item attributes. For example, the buyer may be interested in women's shoes. Certain type of women's shoes is provided to the user interface in visual representation as silhouettes. The buyer selects a category of shoe in silhouette, and, as a result, shoes of that category, with certain attributes, such as the color, fabric, size, price, and the like, will be returned for the user to see and possibly purchase. This can be implemented by the transaction facility 10, after receiving and processing the search request, communicating a response to the web browser application 30. The response could be, for example, an Internet document or web page that, when rendered by the browser application 30, displays a search results page showing one or more item listings, possibly with attributes, that satisfy the user's search request. The item listings are, in some embodiments, presented by a presentation module, which may be a web server or an application server.

In some embodiments, the search engine module, not shown but of a type well known in the industry, could provide the actual search function. For instance, the search engine module, in some embodiments, receives and processes a search request to identify the item listings that satisfy the search request. It will be appreciated by those skilled in the art that a variety of search techniques might be implemented to identify item listings that satisfy a search request. In general, however, the item attributes of item listings are analyzed for the presence of the user-provided search terms. For instance, in some embodiments, selected silhouette can be converted to textual information and used to query system storage.

In an alternative embodiment, the search engine module may represent an interface to a search engine implemented as an external component or module, for example, as part of transaction facility 10, or as a separate external module. In such a scenario, the search engine module may simply receive the set of item listings that satisfy a search query.

Figure 4:
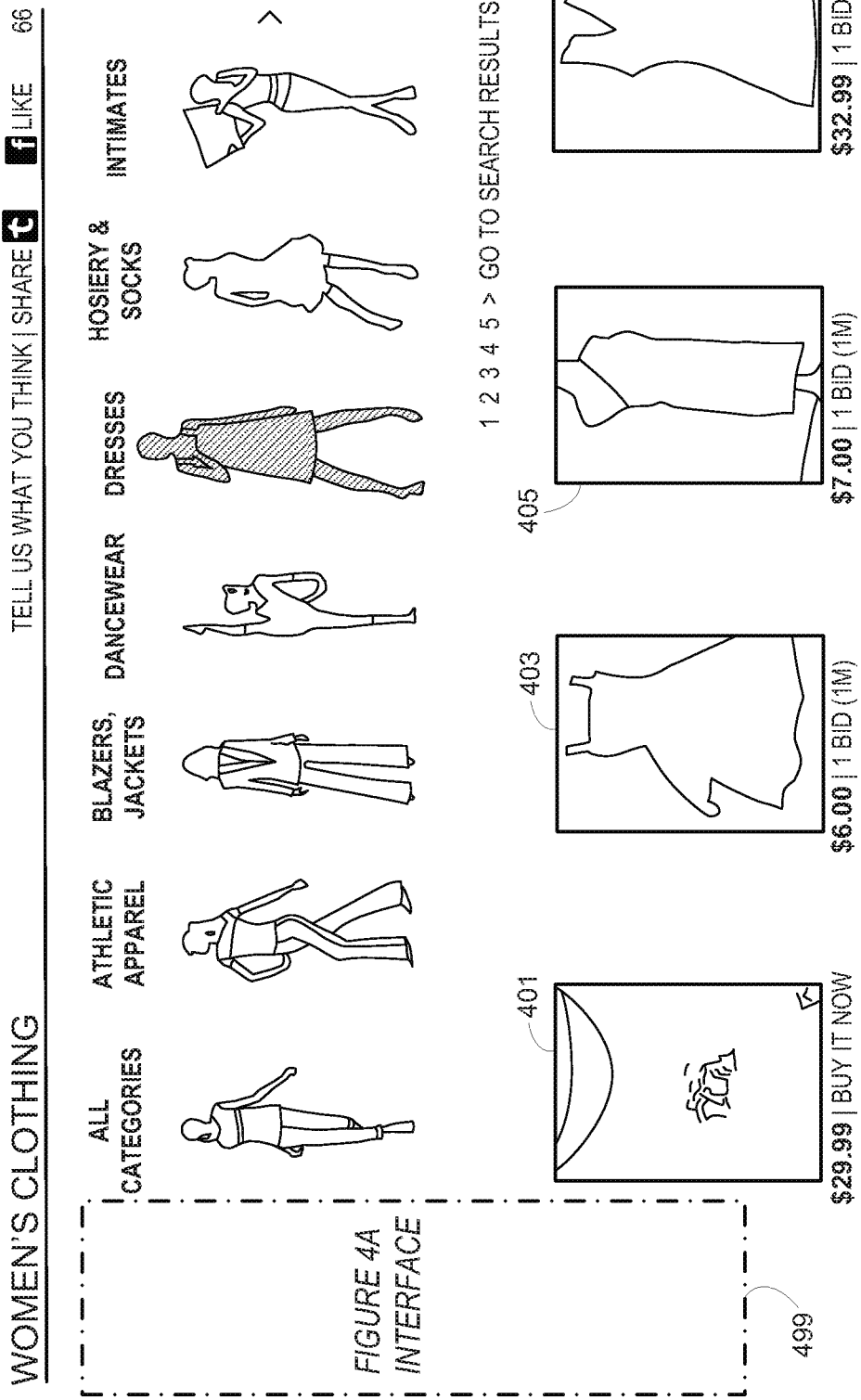
FIG. 4 illustrates an example of a women's clothing page on an e-Commerce system web site.

FIG. 3 illustrates a fashion related page 300 having a bar 301 with various categories such as women's clothing, men's clothing, and the like. If the user hovers his or her mouse over any an item certain fly-out navigation appears. For example, hovering over "Women" will give the categories of women's items. Hovering over or clicking Women's Clothing, for example, provides the Women's Clothing page seen in FIG. 4. Also shown in FIG. 4A is a navigation pane that may be used with FIG. 4 as illustrated at the left of FIG. 4. Showing in the illustration is All Categories and the results set 400 with items 401, 403, 405, and the like. As can be seen, and as discussed above, the landing page embodies silhouettes for much of its graphics. Women's Clothing is given as an example, it being understood that what is described would be applied to Men's Clothes, Women's Shoes, Men's Shoes, and any of the other categories offered for sale.

Figure 5B:
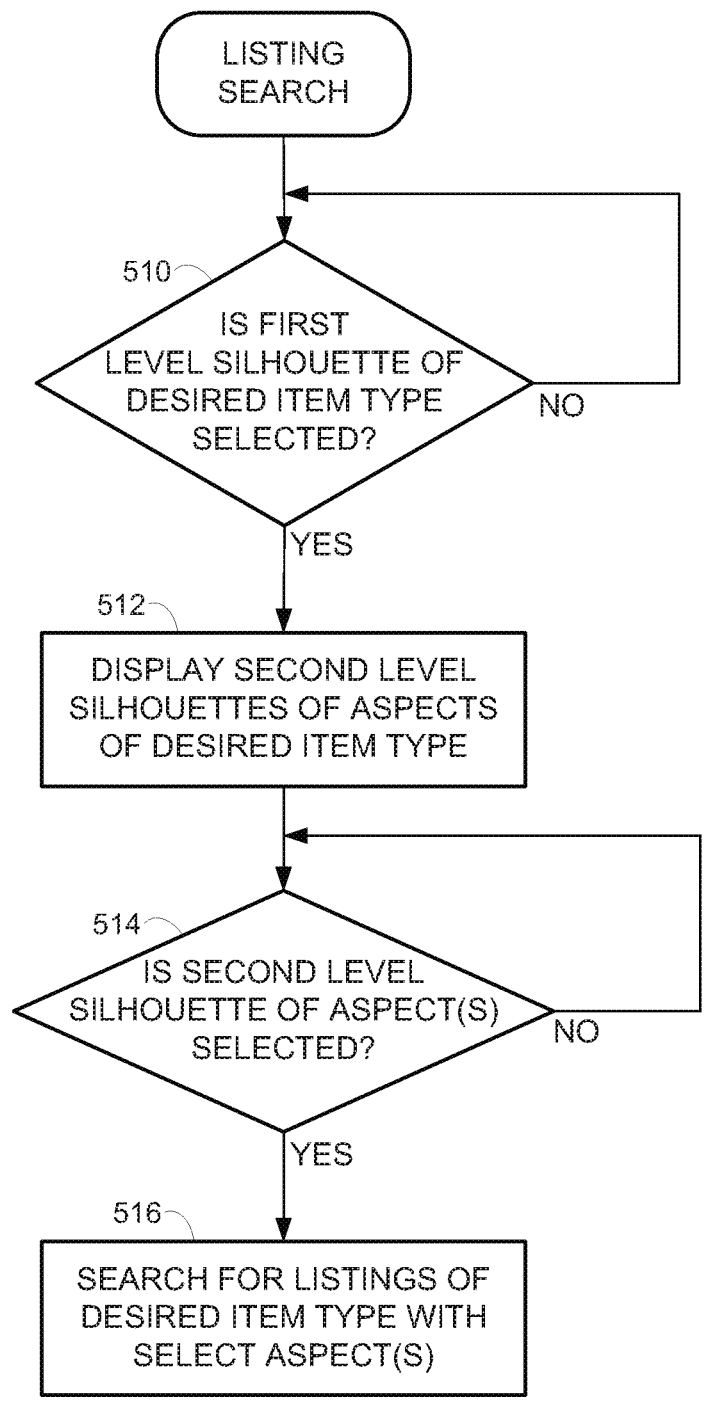
FIG. 5B illustrates an exemplary implementation of the operation of FIG. 5.
Figure 5D:
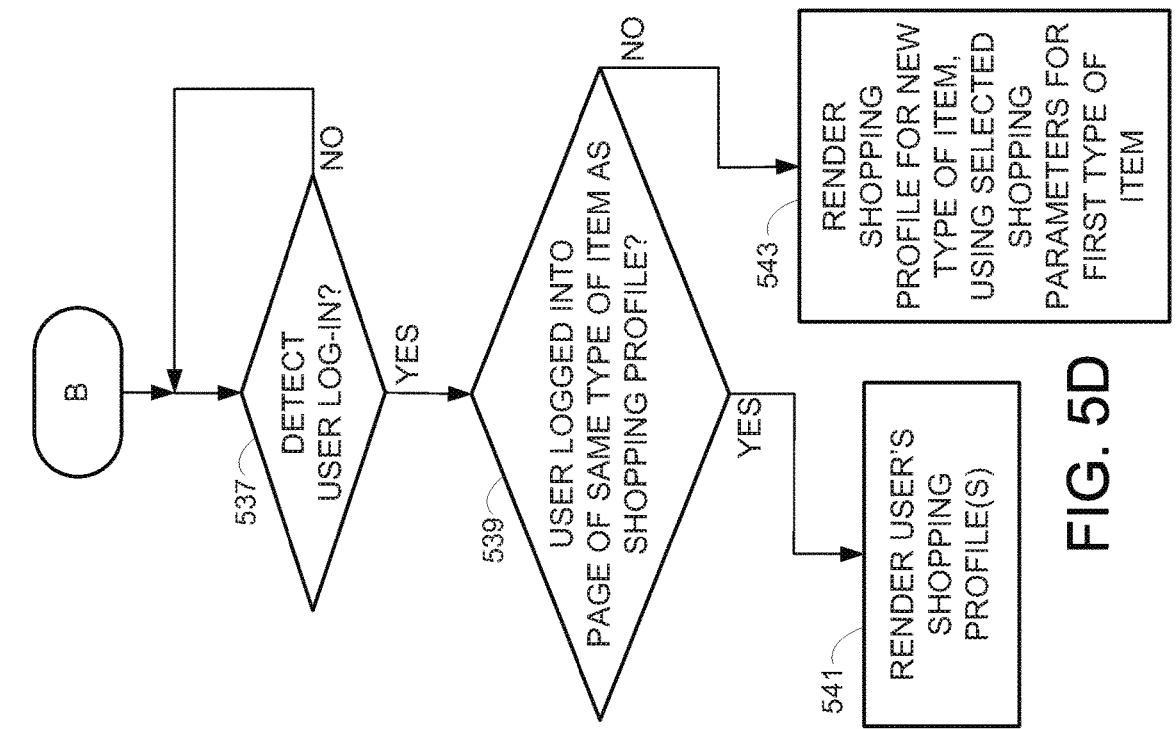
FIGS. 5C and 5D illustrate an exemplary implementation of the operation of creating shopping profiles.

Turning to FIG. 5, if the user selects the "Dresses" silhouette in FIG. 4, the "Dresses" silhouette slides to the left as at 501 showing, or visually uncovering, multiple silhouettes of the various elements of dresses, such as style or length, sleeve, and the like. This is essentially a set of subcategory silhouettes for the primary silhouette "Dresses." Selecting a particular length and sleeve type will allow one to search by that sleeve type and length of dress. In addition, there is the ability to refine one's search by size of the item desired, concurrently with length and sleeve types, as discussed below. While it is well known to those of ordinary skill in the art how to implement the above description of multilevel silhouettes, the following is included as a matter of additional teaching. Referring to Figure B, when a user is performing a listing search, the system, as seen at 510, checks to see whether a first level silhouette of a desired type of item, such as the "Dress" icon of FIG. 5, has been selected. If the selection is made, then at 512, the system provides signals to display a second level of silhouettes of aspects of item of the selected type. Then as at 514, the system checks to see whether one of the second level silhouettes representing aspects has been selected. If it has been selected, then, as at 516, the system searches, such as by querying a database, for listings of the selected desired type of item having the selected aspect. The display of the second level of silhouettes can be done, for example, by the system providing a signal to "slide" or move the selected primary icon of FIG. 4 to one side of the rendering at FIG. 5, while concurrently displaying the second level of silhouettes seen in FIG. 5 in order to give the appearance to the user of the selected icon sliding over to uncover the second level of silhouettes.

FIG. 5A illustrates a navigation pane that can be used with FIG. 5, as illustrated at the left of FIG. 5. Below the "Create New Profile" box 521 is seen a size map in tile format, comprising the various sizes, and equating numeric sizes to alpha sizes. While the size map is shown in tile format, it could be rendered in silhouette or in any other icon type format. For example, one could select S, 4, 6 and the results set shows dresses of the above length and sleeve type, in sizes 4 and 6, with the alpha designation "Small." This would be concurrent with searching the aspects discussed above. Alternatively, one can select only size 4 under Small and the above result set would be limited with Small, size 4. This gives the user for whom a size 6 might be a little too large the ability to refine her size. Further, it shows the user the relations between the size in alpha (Small) and the numerical sizes in a visual way. As another example, size mapping can be done by two or more alpha sizes, or by more than one or two numeric size. As another example, one might know that the appropriate fit is a small or medium, but not really a size 10. So the user can unselect 10 under medium, leaving 8 under Medium, and also select Small 4, 6. The search results could be all items in 4 or 6, with the alpha size Small appended, and all items in 8, with alpha size Medium appended. Alternatively if a user isn't sure what sizes are within the Medium category, the size map illustrates this visually.

The tile aspect is not limited to the size map. It can also be used in search results in the result set. One example might be for search results, using a tile treatment for various groupings of data, for example, stores or boutiques that handle specific items in the search. Another example might to tile brands, or to tile profiles on a search page. Grouping together related items by tile formatting, or grouping together related data by tile formatting, is an improvement over just putting one big block data on the page.

Continuing with providing the user a combination of item aspects to search on, FIG. 5 illustrates a left navigation pane that allows the user to search by Brand; Price; Condition of the item offered for sale; Format; and Seller type, identified as shown in the illustration. Again, while these elements are illustrated as selectable words, they could easily be provided as icons or silhouettes. Each of these elements can be selected and a search could search for items with the selected aspects, concurrently with the other aspects discussed above.

In some systems, when a search in a particular size results in no items found, the system will tell the user there are no items in that size. This can give the user a bad experience. Rather than tell the user there are no items in that size, the page can merely gray out the items on the results set, giving essentially the same information but also having the ability to alleviate or lessen a bad user experience.

Size also varies by manufacturer. A Burberry size 4 may be equivalent to a J.Crew size 2. Some customers shop by brand and size. For example, people who are shopping at Burberry are not necessarily the same people shopping at Gap but they may know what size they wear in Gap versus what size they wear at Burberry. For example, Burberry size small may equate to a 4 in Burberry, where a Gap size small might equate to a size 4 in Gap. While the two are very similar; it may be that just the waist measurements are slightly different, but most of the customers know what sizes fit them by brand. Thus size mapping can be very useful for searching by Brand in addition to other search aspects.

Size mapping can be accomplished, for example, by on online sales organization mining historical sales data. That is, data on what people tend to buy could be mined by computer. Alternatively, this can be done manually. For example, searching people who buy one brand and size and who also buy another brand and size is a relatively simple search algorithm. Other algorithms can also be developed. The results can be aggregated or organized statistically and stored in a search database for presentation to the user as a size map.

Another example of search is single searching on Brand, or multi-selecting Brands for search, according to the user's preference. This can be done in at least three ways. One is to scroll down under Brand in the vertical navigation pane of FIG. 5 and select the desired brand(s). If the user multiselects and chooses more than one brand, those brands will concurrently be searched using a search database including the brand data, with the other search aspects discussed above and the results set could show items in the brands, sizes, and types as discussed above. In other words, the system will then pull in all the brands available for that style, sleeve, and size.

Figure 7:
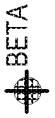
FIG. 7 illustrates an example of a picture of a product of a given brand, using image similarity to match the product with similar products of different brands.
Figure 9:
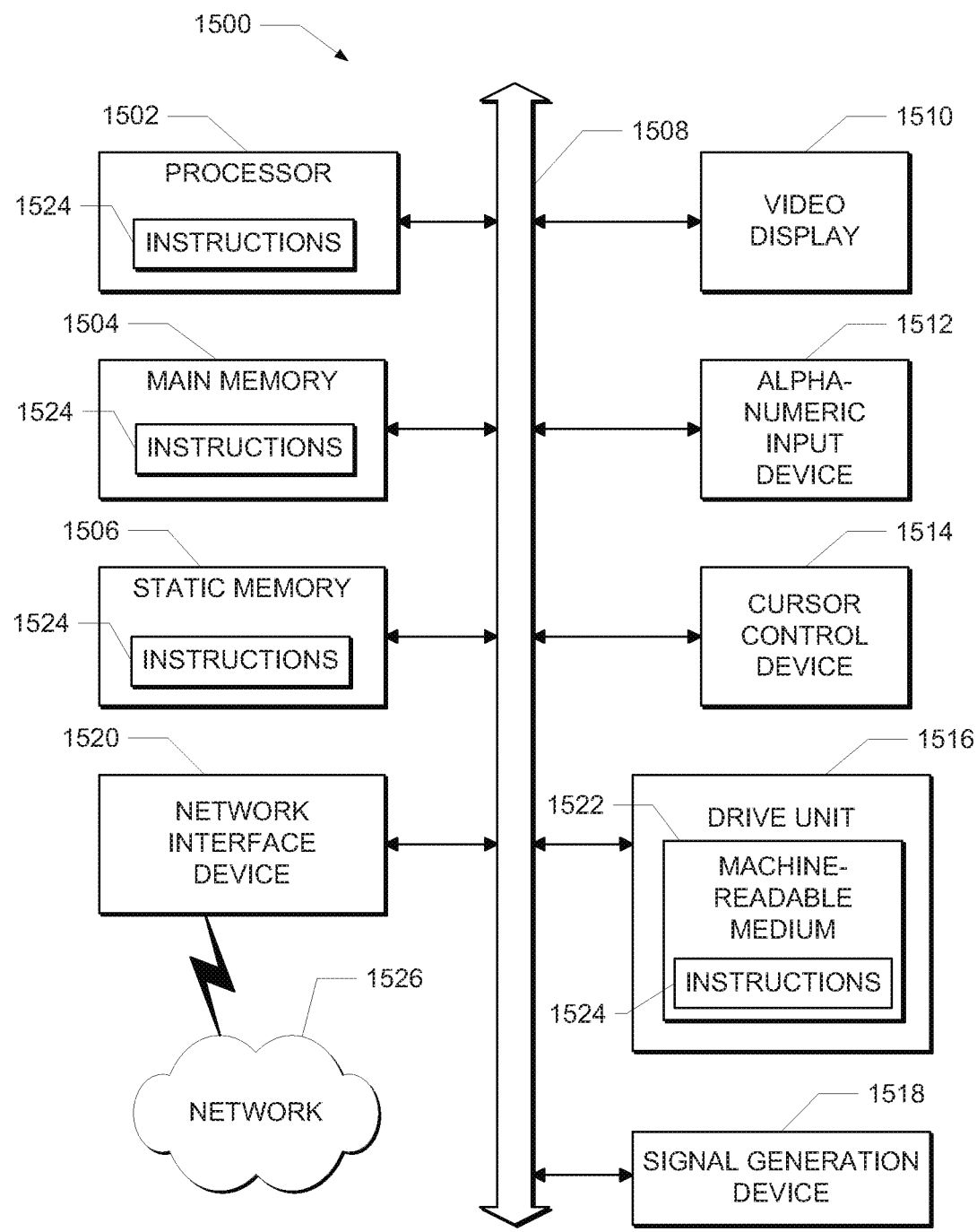
FIG. 9 illustrates a diagrammatic representation of machine in the exemplary form of a computer system.

Another way is the click "Choose More Brands" on FIG. 5. When Choose More Brands is clicked in FIG. 5, a layer such as in FIG. 6 can open and the multiple brands can be available to be selected. Alternatively, a picture of a brand and product can be displayed as at the left of FIG. 7 using known image matching technology that matches a word to a picture, and then using image similarity matching technology that matches that picture with pictures in other brands. This can result in the additional (more) brands at the right of FIG. 7.

In yet another example, a populating typing implementation can be used as in FIG. 8 by selecting "Short List" and beginning typing in "BCBG," that the user can check and select. If the user begins typing "Tahari" that populates as well. Alternatively, one can type just T, and select T, and the user will be shown everything that is available in brands beginning with T.

Further, one can click on a brand like Theory, and there would be a database correlating Theory with related brands such as Tahari, and BCBG. The latter two brands can be displayed as alternates to, or along with, BCBG. One can also create a list of selected or favorite brands, sometimes called a "shortlist." This can be done by clicking Shortlist in the layer of FIG. 6, as an example, and entering or selecting the desired brands in the resulting window. One can search on all the brands in the shortlist, or can deselect some of them if the user just wants to see what's available in one or a few of the brands.

Referring back to FIG. 5, Condition and Format is seen in the left navigation pane. This refines down the result set by indicating the condition of the item and the type of sale it is offered under. If the user mouses over any item in the result set that item will appear with, for example, title, price information and More Like This, which can link to an image search page in order to find more brands like the one searched or viewed, in addition to the type, sleeve length and size as discussed.

The system can also implement a Create a New Profile function in order to include a shopping profile function. When one clicks on Create New Profile in FIG. 5, the system may open up a window as seen in FIG. 8. If the user is coming from a women's page it defaults to Women; if the user is coming from a men's page it defaults to Men. Then the user can enter a name for a shopping profile for current or subsequent use without having to go back and re-refine the aspects in the search once the shopping profile is completed. The user may give the shopping profile a name. For example, the user could name a shopping profile Diana's Every Day Brands and can enter such parameters as waist size shoe size, and preferred brands, which can then be saved.

The user can be given the option of creating a number of shopping profiles. For example, the user can create and name a second shopping profile, for example, Diana's High-End Brands. This could be a second shopping profile for items, for example, that are more expensive than the items in Diana's Every Day Brands. The two profiles can be used, one for every day shopping, and the other for special purchase shopping, at a future date without having to re-refine the aspects of the items searched. One can even create a profile for another person such as a spouse or guest for similar use.

One use of the shopping profile is that on subsequent log-in's the user's shopping profile will be presented to the user. For example the user can be presented with a dropdown of each of her or his different shopping profiles and the user can choose which one is desired at the time. But instead of going through all the refinement processes discussed above, the user easily switches to Diana's Every Day Brands, in our example, and the shopper profile refines down. That is, the entire shopping profile could be refined down, saving significant time and improving the shopping experience.

Further, the shopping profile can be implemented such that once you select an item, even an item in another category, for example, Blazers and Jackets instead of Dresses, which is the current example, the shopping profile will hold all stored refinements and preselect those refinements in the category Blazers and Jackets, so it becomes easy for the user to look at several different categories at once. This feature can be a great help in minimizing what has come to be known as "buyer fatigue." As a further example, the user goes to the shopping profile and selects pants, selects her sizes, and selects her brands. The user can then go to Dresses, reselect her brands, and reselect her sizes, in what is an easy way to select a search.

A further use of the shopper's profile is as an aid in sending targeted emails. The data in the shopping profile can be used to target sales. For example, the data can be mined and determine that the user's favorite brand is BCBG. If there is a sale for that brand, the user can be sent a targeted email. Further, if the data shows the user's favorite brand is BCBG and there is a Tahari sale, which is a related brand to the user's favorite brand, BCBG, the system can send the user a targeted email based on the related brand.

Yet another other way the shopper profile can be used is to provide the online sales organization information relating to what its inventory needs are. For example, if there are a lot of buyers indicating certain favorite brands and other information in the shopper profile, this information indicates what pockets of inventory the online sales organization may be shallow in, what users are looking for, and what the online organization needs to move. The online sales organization can then use the information in the shopper profile for these purposes.

While it is apparent to one of ordinary skill in the art how to implement the above shopping profile embodiment, the following is provided as additional teaching. FIG. 5 is a is a flow chart illustrating a method 500 for providing shopping profiles, and using the shopping profiles for shopping, including shopping during a subsequent log-in, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 1A. Referring to FIG. 5B, the system at 531 checks to determine whether a user has created a shopping profile. If the system detects a creation of a shopping profile it takes the Yes path to decision point 533. If not, it continues checking for an appropriate time. At 533 the system checks for the detection of additional shopping profiles. If the creation of additional shopping profiles are detected, up to the maximum number of shopping profiles, as the system may be designed, the system 535 associates the shopping profiles with the user and stores the shopping profile. Alternatively, the system may store only the selection shopping parameters of the shopping profile. If, on the other hand, no additional shopping profiles are detected, the system may take the No path and continue check, for at 533 for an appropriate period of time before performing the store step at 535.

Figure 5C:
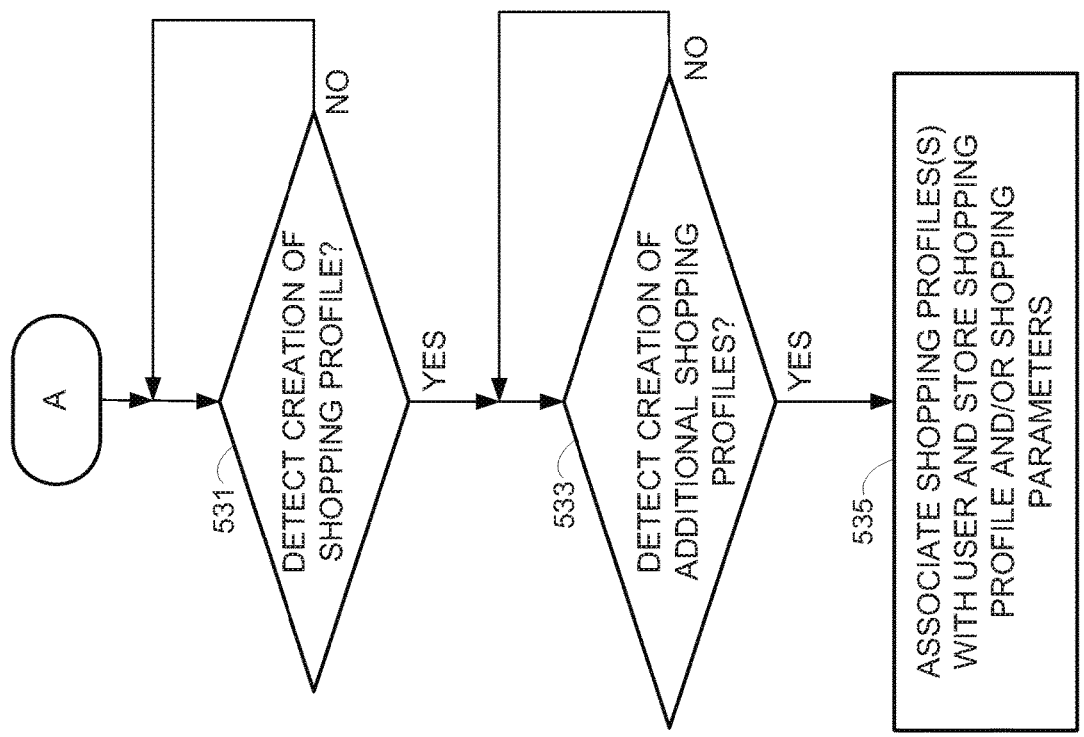

As discussed above, the system checks to detect a user log-in, for example, a subsequent log-in of the user, as at 537 of FIG. 5C. If a log-in is detected the decision takes the Yes path and proceeds to decision point 539 where the system checks to determine whether the user is logged in to a page offering for sale the same type of item for which the shopping profile was created. It the user is so logged-in, the system takes the Yes path to function 541 where the system provides the appropriate signal to render the user's shopping profile at the client machine for the user to use in shopping. If the user is logged into a page where a different type of product than the one for which the shopping profile was created (as an example, the users logs in to blazers, and the shopping profile has been created for Dresses), as at the No path of 539, the system then proceeds to step 543 at which the system provides the appropriate signal to render at the user's client machine a shopping profile for the new type of item. This can be done by propagating (or refining) the shopping profile for blazers with the appropriate selected shopping parameters from the already created and stored shopping profile of the user. The user will not have to re-refine the shopping profile from the beginning for the new type of item and thus a certain amount of "Buyer Fatigue" can be forestalled.

Hardware Operation

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Computer System

FIG. 8 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software) 1523 embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be 1regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

APPENDIX

A Mouseover or hover box refers to a GUI event that is raised when the user moves or "hovers" the cursor over a particular area of the GUI. The technique is particularly common in web browsers where the URL of a hyperlink can be viewed in the status bar. Site designers can easily define their own mouseover events using Javascript[1] and Cascading Style Sheets.[2] In case of multiple layers the mouseover event is triggered by the uppermost layer.
Mouseover events are not limited to web design and are commonly used in modern GUI programming. Their existence might not even be known to the user as the events can be used to call any function and might affect only the internal workings of the program.
Tooltip
A special usage of mouseover event is a tooltip showing a short description of the GUI object under the cursor. The tooltip generally appears only after the mouse is held over the object for a certain amount of time.

EXAMPLES

```
<!-- Direct usage not recommended | does not conform with web standards -->
<img id="myImage" src="/images/myImage.jpg" onMouseOver="alert('your message');">
// javascript without any framework
var myImg = document.getElementById('myImage');
function myMessage( ) {
    alert('your message');
}
if(myImg.addEventListener) { //addEventListener is the standard method to add events to objects
    myImg.addEventListener('mouseover', myMessage, false);
}
else if(myImg.attachEvent) { //for Internet Explorer
```

```
    myImg.attachEvent('onmouseover', myMessage);
}
else { //for other browsers
    myImg.onmouseover = myMessage;
}
// jQuery example | degrades well if javascript is disabled in client
browser
$("img").mouseover(function( ){
    alert('your message');});
```

What is claimed is:

1. A computer-implemented method, comprising:
providing, by a server, a first user selectable image of an item for rendering on a user interface at the client machine in a first position, the first user selectable image corresponding to a category of the item, wherein upon activation of an electronic signal the first user selectable image moves its position on the user interface to uncover space on the user interface;
responsive to detecting activation of the electronic signal, causing the first user selectable image to move from the first position while concurrently providing, by the server, a plurality of user selectable images for rendering on the user interface at the client machine, each of the plurality of user selectable images corresponding to sub-categories of the category of the item, wherein rendering the plurality of user selectable images comprises moving the plurality of user selectable images from a second position to a third position, the third position previously displaying at least one other user interface element prior to moving the plurality of user selectable images;
detecting, by the server, a first selection of one of the plurality of user selectable images corresponding to a sub-category of the category of the item responsive to detecting a second selection, searching, by the server, for one or more item listings related to the sub-category; and
providing, by the server, for rendering on the user interface at the client machine the one or more item listings.

2. The computer-implemented method of claim 1, wherein the first user-selectable image of an item comprises a silhouette image of the item.

3. The computer-implemented method of claim 1, further comprising providing for rendering on the user interface at the client machine a grayed-out image indicating that no image representing the sub-category of the item was found.

4. The computer-implemented method of claim 1, wherein the sub-category comprises one of style, length type, and sleeve type.

5. One or more computer-readable hardware storage device having stored therein a set of instructions that, when executed by one or more processors of a computer, causes the computer to perform operations comprising:
providing, by a server, a first user selectable image of an item for rendering on a user interface at the client machine in a first position, first user selectable image corresponding to a category of the item, wherein upon activation of an electronic signal the first user selectable image moves its position on the user interface to uncover space on the user interface;
responsive to detecting activation of the electronic signal, causing the first user selectable image to move from the first position while concurrently providing, by the server, a plurality of user selectable images for rendering on the user interface at the client machine, each of the plurality of user selectable images corresponding to sub-categories of the category of the item, wherein rendering the plurality of user selectable images comprises moving the plurality of user selectable images from a second position to a third position, the third position previously displaying at least one other user interface element prior to moving the plurality of user selectable images;
detecting, by the server, a first selection of one of the plurality of user selectable images corresponding to a sub-category of the category of the item responsive to detecting a second selection, searching, by the server, for one or more item listings related to the sub-category; and
providing, by the server, for rendering on the user interface at the client machine the one or more item listings.

6. The one or more computer-readable hardware storage device of claim 5, wherein the first user-selectable image of an item comprises a silhouette image of the item.

7. The one or more computer-readable hardware storage device of claim 5, the operations further comprising providing for rendering on the user interface at the client machine a grayed-out image indicating that no image representing the sub-category of the item was found.

8. The one or more computer-readable hardware storage device of claim 5, wherein the sub-category comprises one of style, length type, and sleeve type.

9. A system comprising:
at least one processor; and
at least one memory including program code, which when executed by at least one processor causes operations comprising:
providing, by a server, a first user selectable image of an item for rendering on a user interface at the client machine in a first position, the first user selectable image corresponding to a category of the item, wherein upon activation of an electronic signal the first user selectable image moves its position on the user interface to uncover space on the user interface;
responsive to detecting activation of the electronic signal, causing the first user selectable image to move from the first position while concurrently providing, by the server, a plurality of user selectable images for rendering on the user interface at the client machine, each of the plurality of user selectable images corresponding to sub-categories of the category of the item, wherein rendering the plurality of user selectable images comprises moving the plurality of user selectable images from a second position to a third position, the third position previously displaying at least one other user interface element prior to moving the plurality of user selectable images;
detecting, by the server, a first selection of one of the plurality of user selectable images corresponding to a sub-category of the category of the item responsive to detecting a second selection, searching, by the server, for one or more item listings related to the sub-category; and
providing, by the server, for rendering on the user interface at the client machine the one or more item listings.

10. The system of claim 9, wherein the first user-selectable image of an item comprises a silhouette image of the item.

11. The system of claim 9, further comprising providing for rendering on the user interface at the client machine a grayed-out image indicating that no image representing the sub-category of the item was found.

12. The system of claim 9, wherein the sub-category comprises one of style, length type, and sleeve type.

13. The computer-implemented method of claim 1, wherein the electronic signal indicates a selection of the first user selectable image.

14. The computer-implemented method of claim 1, wherein the plurality of user selectable images are silhouette images.

15. The computer-implemented method of claim 14, wherein the first user selectable image represents a category of a product.

16. The one or more computer-readable hardware storage device of claim 5, wherein the electronic signal indicates a selection of the first user selectable image.

17. The one or more computer-readable hardware storage device of claim 5, wherein the wherein the plurality of user selectable images are silhouette images.

18. The one or more computer-readable hardware storage device of claim 17 wherein the first user selectable image represents a category of a product.

19. The system of claim 9, wherein the electronic signal indicates a selection of the first user selectable image.

20. The system of claim 9, wherein the wherein the plurality of user selectable images are silhouette images.

* * * * *